US010558696B2

(12) United States Patent
Liu

(10) Patent No.: US 10,558,696 B2
(45) Date of Patent: Feb. 11, 2020

(54) SEMANTIC CATEGORY CLASSIFICATION

(71) Applicant: eBay Inc., San Jose, CA (US)

(72) Inventor: Mingkuan Liu, San Jose, CA (US)

(73) Assignee: EBAY INC., San Jose, CA (US)

( * ) Notice: Subject to any disclaimer, the term of this patent is extended or adjusted under 35 U.S.C. 154(b) by 215 days.

(21) Appl. No.: 15/429,564

(22) Filed: Feb. 10, 2017

(65) Prior Publication Data
US 2017/0235824 A1 Aug. 17, 2017

Related U.S. Application Data

(60) Provisional application No. 62/293,922, filed on Feb. 11, 2016.

(51) Int. Cl.
*G06F 16/35* (2019.01)
*G06F 17/27* (2006.01)
*G06Q 40/00* (2012.01)
*G06Q 20/10* (2012.01)
*G06N 20/00* (2019.01)

(52) U.S. Cl.
CPC ........ *G06F 16/358* (2019.01); *G06F 17/2785* (2013.01); *G06N 20/00* (2019.01); *G06Q 20/10* (2013.01); *G06Q 40/00* (2013.01)

(58) Field of Classification Search
CPC .......... G06F 17/30713; G06F 17/2785; G06F 16/358; G06N 99/005
USPC ....................................................... 707/723
See application file for complete search history.

(56) References Cited

U.S. PATENT DOCUMENTS

| 6,006,221 | A | 12/1999 | Liddy et al. |
| 8,473,532 | B1 | 6/2013 | Ben |
| 8,885,984 | B1 | 11/2014 | Lavi et al. |
| 9,141,882 | B1 * | 9/2015 | Cao .......................... G06F 16/35 |
| 9,224,386 | B1 * | 12/2015 | Weber ...................... G10L 15/06 |
| 9,665,628 | B1 * | 5/2017 | Dubey .............. G06F 17/30377 |

(Continued)

FOREIGN PATENT DOCUMENTS

| CN | 108431809 | | 8/2018 |
| CN | 108701118 | A | 10/2018 |

(Continued)

OTHER PUBLICATIONS

Kait. "New in iOS 8: A Faster Way to Save with Pocket 5.6" Published Sep. 15, 2014. Accessed Dec. 8, 2018 from <https://getpocket.com/blog/2014/09/coming-soon-in-ios-8-a-faster-way-to-save-with-pocket-5-6/> (Year: 2014).*

(Continued)

*Primary Examiner* — Robert W Beausoliel, Jr.
*Assistant Examiner* — Arthur Ganger
(74) *Attorney, Agent, or Firm* — Schwegman Lundberg & Woessner, P.A.

(57) ABSTRACT

In accordance with an example embodiment, large scale category classification based on sequence semantic embedding and parallel learning is described. In one example, one or more closest matches are identified by comparison between (i) a publication semantic vector that corresponds to at least part of the publication, the publication semantic vector based on a first machine-learned model that projects the at least part of the publication into a semantic vector space, and (ii) a plurality of category vectors corresponding to respective categories from a plurality of categories.

20 Claims, 21 Drawing Sheets

(56) References Cited

U.S. PATENT DOCUMENTS

| | | |
|---|---|---|
| 9,684,653 B1 | 6/2017 | Bhagat |
| 2007/0294223 A1 | 12/2007 | Gabrilovich et al. |
| 2009/0138454 A1 | 5/2009 | Rayner et al. |
| 2010/0010973 A1 | 1/2010 | Harrington |
| 2010/0228733 A1 | 9/2010 | Harrison et al. |
| 2011/0029525 A1 | 2/2011 | Knight |
| 2011/0085739 A1 | 4/2011 | Zhang et al. |
| 2011/0229031 A1* | 9/2011 | Ranganathan ..... G06K 9/00664 382/170 |
| 2012/0131139 A1 | 5/2012 | Siripurapu et al. |
| 2013/0013601 A1 | 1/2013 | Kabiljo et al. |
| 2013/0013603 A1 | 1/2013 | Parker et al. |
| 2013/0318014 A1 | 11/2013 | Ismalon |
| 2014/0156567 A1 | 6/2014 | Scholtes |
| 2015/0082156 A1 | 3/2015 | Rollins et al. |
| 2015/0186495 A1 | 7/2015 | Abbas et al. |
| 2015/0199339 A1 | 7/2015 | Mirkin et al. |
| 2015/0278254 A1 | 10/2015 | Bhardwaj et al. |
| 2015/0331929 A1 | 11/2015 | El-Saban et al. |
| 2015/0339756 A1 | 11/2015 | Konik et al. |
| 2016/0012124 A1 | 1/2016 | Ruvini et al. |
| 2016/0042296 A1 | 2/2016 | Shan et al. |
| 2016/0063122 A1* | 3/2016 | Asur ..................... G06F 16/345 707/725 |
| 2016/0078057 A1 | 3/2016 | Perez De |
| 2016/0155069 A1* | 6/2016 | Hoover .................. G06Q 30/06 706/12 |
| 2016/0179933 A1 | 6/2016 | Dimassimo et al. |
| 2016/0196340 A1 | 7/2016 | Cheslow |
| 2016/0225053 A1 | 8/2016 | Romley et al. |
| 2016/0232238 A1 | 8/2016 | Sweeney et al. |
| 2017/0083602 A1* | 3/2017 | Liu ....................... G06F 16/285 |
| 2017/0091240 A1 | 3/2017 | Yu et al. |
| 2017/0124618 A1 | 5/2017 | Roeseler et al. |
| 2017/0177712 A1 | 6/2017 | Kopru et al. |
| 2017/0372398 A1 | 12/2017 | Kopru et al. |
| 2018/0052928 A1 | 2/2018 | Liu et al. |
| 2018/0107685 A1 | 4/2018 | Kale et al. |
| 2018/0114144 A1* | 4/2018 | Miranda ................ G06N 5/022 |
| 2019/0179891 A1* | 6/2019 | Rangarajan Sridhar ..................... G06F 17/2715 |

FOREIGN PATENT DOCUMENTS

| | | |
|---|---|---|
| WO | WO-2017112650 A1 | 6/2017 |
| WO | 2017/139575 A1 | 8/2017 |
| WO | 2018/035139 A1 | 2/2018 |

OTHER PUBLICATIONS

U.S. Appl. No. 15/179,314, filed Jun. 10, 2016, Single Step Cross-Linguistic Search Using Semantic Meaning Vectors.
"U.S. Appl. No. 15/179,314, Response filed Sep. 13, 2018 to Non Final Office Action dated Jun. 14, 2018", 19 pgs.
"Voluntary Amendment filed for Korean Patent Application No. 10-2018-7020879 dated Jul. 19, 2018", (w English Claims), (dated Jul. 19, 2018), 8 pages.
"International Application Serial No. PCT US2017 017371, International Preliminary Report on Patentability dated Aug. 23, 2018", 10 pgs.
"U.S. Appl. No. 15/179,314, Examiner Interview Summary dated Aug. 6, 2018", 3 pgs.
Non-Final Office Action received for U.S. Appl. No. 15/179,314, dated Jun. 14, 2018, 13 pages.
International Preliminary Report on Patentability received for PCT Application No. PCT/US2016/067725, dated Jul. 5, 2018, 7 pages.
Amendment filed on Sep. 10, 2018 for Korean Patent Application No. 10-2018-7026111, 9 pages. (2 pages English Translation and 7 pages Official Copy).
Final Office Action received for U.S. Appl No. 15/179,314, dated Jan. 11, 2019, 14 pages.
Non-Final Office Action received for U.S. Appl. No. 15/439,021, dated Jan. 11, 2019 13 pages.
Bahdanau, et al., "Neural Machine Translation by Jointly Learning to Align and Translate", Published as a conference paper at ICLR 2015, May 19, 2016, pp. 1-15.
Burch, "How to Calculate Hamming Distance", Retrieved from the Internet URL: <https://sciencing.com/how-to-calculate-hamming-distance-12751770.html>, Jun. 20, 2018, pp. 1-2.
Cho, et al., "Learning Phrase Representations using RNN Encoder Decoder for Statistical Machine Translation", arXiv: 1406.1078, Sep. 3, 2014, 15 pages.
Douze, et al., "Polysemous Codes", Retrieved from the Internet URL: <https://arxiv.org/pdf/1609.01882.pdf>, Oct. 10, 2016, pp. 1-18.
Gao, et al., "Learning Continuous Phrase Representations for Translation Modeling", Microsoft Research, 2014, pp. 699-709.
Lin, et al., "Deep Learning of Binary Hash Codes for Fast Image Retrieval", Retrieved from the Internet URL: <http://www.iis.sinica.edu.tw/~kevinlin311.tw/cvprw15.pdf>, 2015, pp. 1-9.
Mino, et al., "Learning Bilingual Phrase Representations with Recurrent Neural Networks", In Proceedings of MT Summit XV, vol. 1, Miami, Florida, USA, Oct. 30-Nov. 3, 2015, pp. 44-55.
International Preliminary Report on Patentability received for PCT Application No. PCT/US2017/046984, dated Feb. 28, 2019, 9 pages.
International Search Report received for PCT Application No. PCT/US2017/046984, dated Oct. 17, 2017, 3 pages.
International Written Opinion received for PCT Application No. PCT/US2017/046984, dated Oct. 17, 2017, 7 pages.
Sutskever, et al., "Sequence to Sequence Learning with Neural Networks", arXiv: 1409.3215, Dec. 14, 2014, pp. 1-9.
Applicant—Initiated Interview Summary received for U.S. Appl. No. 15/439,021, dated Aug. 30, 2019, 3 pages.
"International Application Serial No. PCT/US2016/067725, International Search Report dated Mar. 22, 2017", 2 pgs.
"International Application Serial No. PCT/US2016/067725, Written Opinion dated Mar. 22, 2017", 5 pgs.
"International Application Serial No. PCT/US2017/017371, International Search Report dated Apr. 25, 2017", 2 pgs.
"International Application Serial No. PCT/US2017/017371, Written Opinion dated Apr. 25, 2017", 8 pgs.
Office Action received for Korean patent Application No. 10-2018-7020879, dated Jun. 27, 2019, 9 pages (5 pages Official Copy and 4 pages English translation).
First Action Interview—Pre-Interview Communication received for U.S. Appl. No. 15/192,323, dated Apr. 19, 2019, 4 pages.
First Action Interview-Office Action Summary received for U.S. Appl. No. 15/192,323, dated Jun. 25, 2019, 3 pages.
Final Office Action received for U.S. Appl. No. 15/439,021, dated Jun. 28, 2019, 14 pages.
Response to Non-Final Office Action filed on Apr. 18, 2019 for U.S. Appl. No. 15/439,021, dated Jan. 11, 2019, 19 pages.

* cited by examiner

SEMANTIC CATEGORY CLASSIFICATION

REFERENCE TO RELATED APPLICATIONS

This application claims the benefit of priority of U.S. Provisional Application No. 62/293,922, filed Feb. 11, 2016, which is hereby incorporated by reference in its entirety.

TECHNICAL FIELD

Embodiments of the present disclosure relate generally to large scale category classification and recommendation system (CatReco) based on sequence semantic embedding and parallel learning.

BACKGROUND

The proper categorization of the publications in a publication corpus is important in helping a system provide publication (e.g., products and/or services) recommendations in response to a user's query. The publication description is used by the system to index the publications such that potential users may locate the publications via a user's query.

BRIEF DESCRIPTION OF THE DRAWINGS

Various ones of the appended drawings merely illustrate example embodiments of the present disclosure and cannot be considered as limiting its scope.

Figure 1:
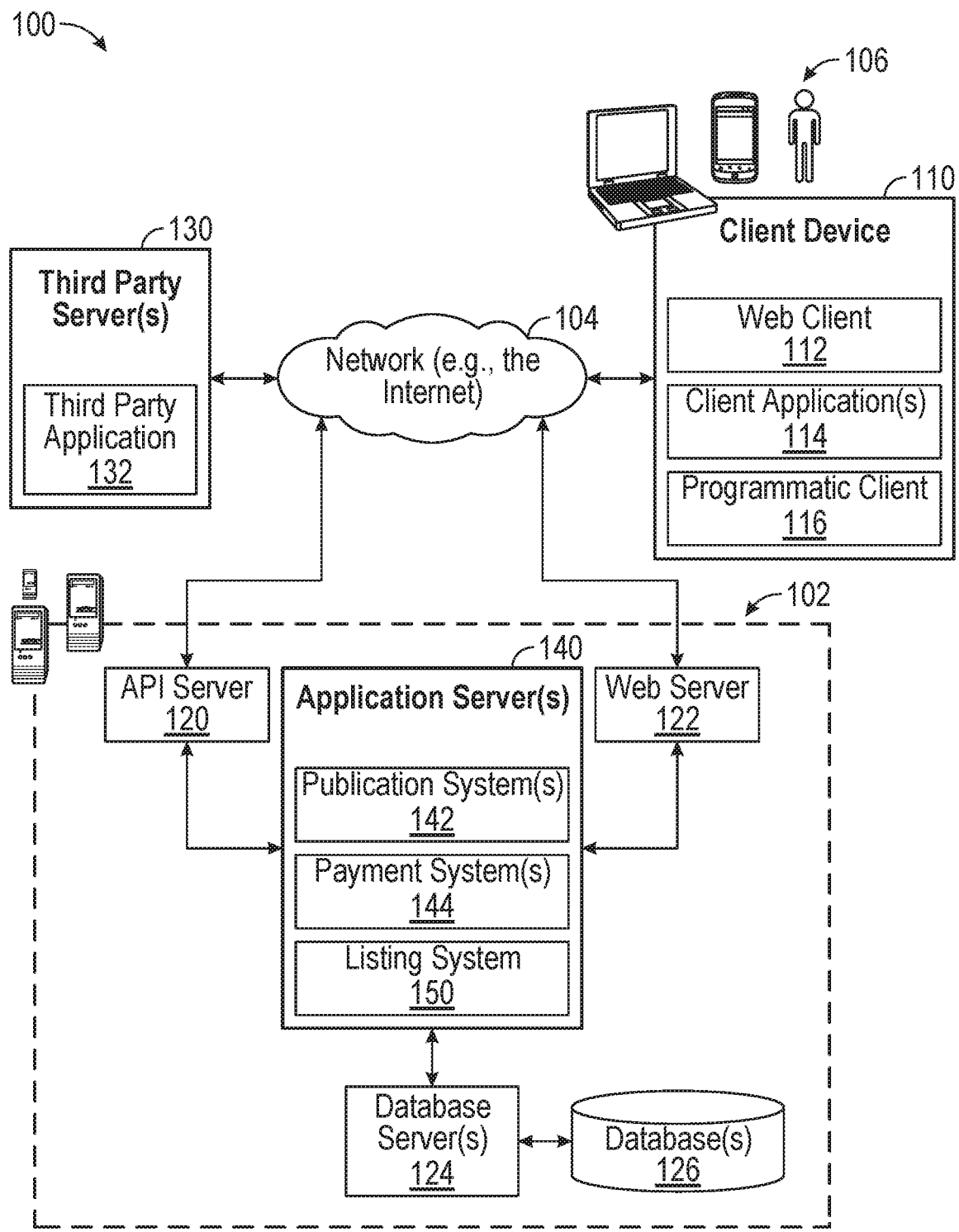
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In a publication corpus very large scale categories are established to organize billions of different publications (product offers) in fine granularity. A category classification system is often used to aid seller categorize listing of publications based on a few title keywords.

Various embodiments describe a parallel learning framework to automatically derive an extremely large size of labeled data (e.g., billions) from unsupervised user logs and use them for supervised machine learning model training.

Example embodiments, use sequence semantic embedding (SSE) methods to encode listing titles (e.g., title keywords for publications being listed) and category tree paths into semantic vector representations as <source sequence, target sequence> pairs. The vector distances of the source and target semantic vector representations can be used as a similarity measurement to get classification recall candidate sets. The classification recall candidate sets may represent a number of LeafCats in a category tree which are identified by a LeafCat ID.

In further embodiments, a language model for every category (e.g., LeafCat) is trained such that a classification recall candidate set can be re-ranked with gradient boosting machine (GBM) ensembled signals from sentence embedding similarity scores (derived using SSE modeling) and language model perplexity scores (derived using statistical language modeling (SLM)). The category recommendation (CatReco) results generated by this combined SSE-SLM-GBM approach appears to be far superior than various other approaches. For example, benchmark testing results using over 370,000 samples covering 19000+ different LeafCats showed an improvement (over a production baseline) of 10+ faster system response time (e.g., ~200 ms to ~20 ms) and reduced classification errors by 24.8% for Top 1 CatReco, 31.12% for Top 3 CatReco and 54.52% for Top 10 CatReco.

The accuracy of the CatReco, especially the accuracy of the top 1 recommended leaf category (LeafCat) can directly impact a user's (e.g., buyer's and/or seller's) overall experience because several important pieces of information about a publication, for example the seller tags, listing fees, and product matching, rely on the LeafCat for a publication. Additionally, the accuracy of identifying the top 1 recommended LeafCat is often the bottleneck for business to consumer (B2C) automated categorization flows. The accuracy of the top 1 CatReco by the publication system can have a direct impact on the gross merchandise volume (GMV), indicative of a total sales dollar value for merchandise sold through a particular marketplace over a certain time frame.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

The client device 110 may comprise, but are not limited to, a mobile phone, desktop computer, laptop, personal digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital publications within the networked system 102. In one embodiment, the networked system 102 is a network-based marketplace that responds to requests for product listings, publishes publications comprising listings of products available on the network-based marketplace, and manages payments for these marketplace transactions. One or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an publication system application (also referred to as a marketplace application), and the like. In some embodiments, if the publication system application is included in a given one of the client device 110, then this application is configured to locally provide the user interface and at least some of the functionalities with the application configured to communicate with the networked system 102, on an as needed basis, for data or processing capabilities not locally available (e.g., access to a database of publications available for sale, to authenticate a user, to verify a method of payment). Conversely if the publication system application is not included in the client device 110, the client device 110 may use its web browser to access the publication system (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital publication information, in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a web system hosted by the third party. The third party web system, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

A listing system 150 provides functionality operable to perform various aspects of listing publications for sale using the user selected data. In various embodiments, sellers may list publications (using the listing system 150) by providing a title or a description of the publication being listed. The title can be referred to as the listing title and is used by the listing system 150 (or other components within the publication system 142) to provide a CatReco for the publication being listed. In further embodiments, the listing system 150 may access the user selected data from the databases 126, the third party servers 130, the publication system 120, and other sources. In some example embodiments, the listing system 150 analyzes the user data to perform personalization of user preferences. As more content is added to a category by the user, the listing system 150 can further refine the personalization. In some example embodiments, the listing system 150 communicates with the publication systems 120 (e.g., accessing publication listings) and payment system 122. In an alternative embodiment, the listing system 150 is a part of the publication system 120.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and listing system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a web system hosted by the third party. The third party web system may, for example, provide one or more promotional, marketplace, or payment functions that are supported by the relevant applications of the networked system 102.

Figure 2:
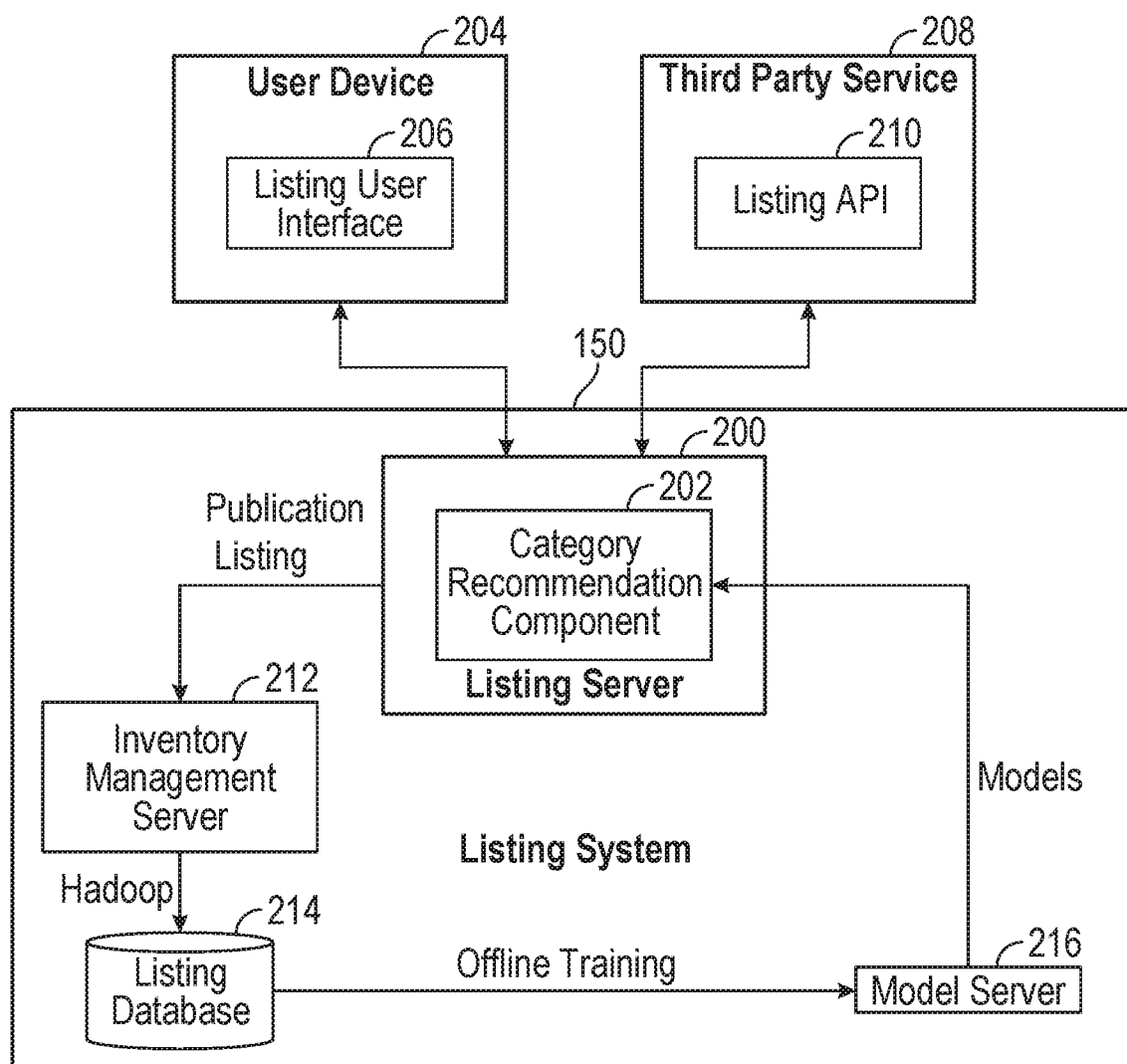
FIG. 2 is a block diagram illustrating the listing system of FIG. 1 in more detail, in accordance with an example embodiment.

FIG. 2 is a block diagram illustrating the listing system 150 of FIG. 1 in more detail, in accordance with an example embodiment. Here, the listing system 150 includes a listing server 200 which acts to perform back end processes related to the listing of publications. The listing system 150 includes, among other components, a categorization recommendation (CatReco) component 202. User device 204 may be used directly by a user to list a publication for sale by interacting with a listing user interface 206 to provide details of the publication for listing. The listing user interface 206 communicates this information to the listing server 200. This process may be interactive in nature. For example, certain inputs by the user, via the listing user interface 206, are transmitted to the listing server 200, at which point the listing server 200 provides feedback, which can then cause the user to alter or add to the listing information provided.

For purposes of this disclosure, the discussion will be limited to the CatReco aspect of the listing server 200 as implemented by the CatReco component 202. In one example embodiment, a user may enter a title or other text input via the listing user interface 206, which may then be passed to the CatReco component 202. The CatReco component 202 can then provide an ordered suggested list of categories for the publication listing, which the user can then choose from via the listing user interface 206. In another example embodiment, a user (e.g., a B2C seller) may upload a list of publications to be listed by the listing system 150. The list of publications includes the listing titles and categories (based on a seller's taxonomy) associated with each entry on the list. The CatReco component 202 may then automatically map the category (based on the seller's taxonomy) to a category (based on the taxonomy of the publication system 142) for each entry. The seller may provide the seller's taxonomy in the inventory list (e.g., entries with listing titles and category) provided by the seller, or the seller may provide a copy of the seller's taxonomy for upload into the publication system 142.

Various embodiments of the CatReco component 202 (in combination with other components within the listing system 150 and the publication system 142) leverages SSE with SLM re-ranking and GBM methods to establish accurate, robust and fast recommendations for a category of a publication being listed.

Figure 3A:
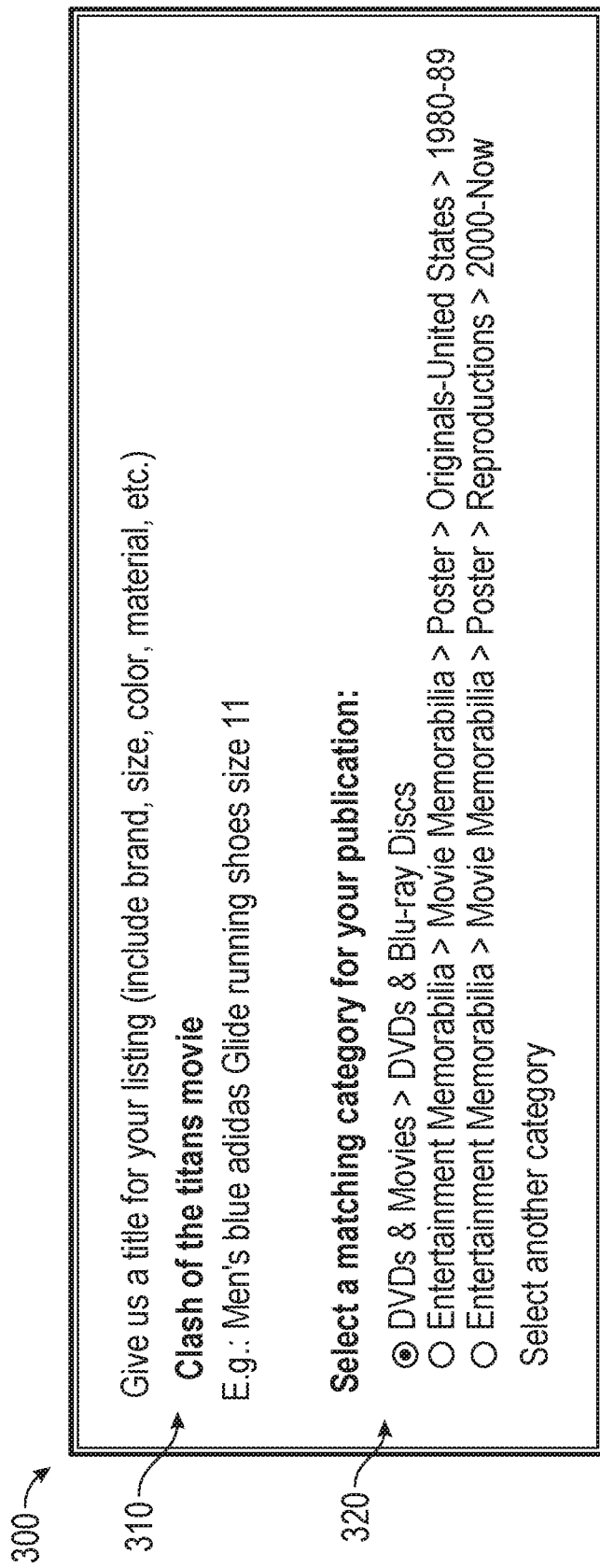
FIG. 3A and FIG. 3B are user interfaces from a listing system used to provide listing titles and select a category for the listing title, according to an example embodiment.
Figure 3B:
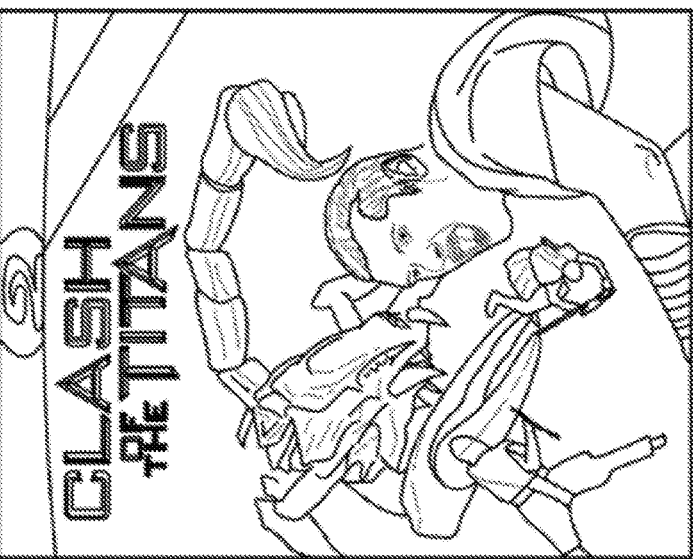

The listing user interface 206 may take many forms. In one example embodiment, the listing user interface 206 is a web page that is executed by a web browser on the user device 204. In another example embodiment, the listing user interface 206 is a mobile application installed on a mobile device. FIGS. 3A and 3B illustrate examples of user interfaces generated by the listing user interface 206 to listing publications and to select a category for the listing publication.

The listing server 200 can also be accessed by a third party service 208 via a listing API 210. An example of a third party service 208 is a web system that offers to aid sellers in the listing process by listing publications on their behalf. The listing API 210 may be specifically designed to interact with the listing server 202 and distributed to multiple third party services 208.

Once a user has selected a category for the listing (due, at least in part, to the CatReco component 202) or the listing system automatically maps the category from the seller's taxonomy to the taxonomy of the publication system 142, the listing server 200 sends the publication listing to an inventory management server 212, which manages the process of publishing the listing by storing it in a listing database 214. This may be accomplished via a distributed architecture, such as Hadoop.

A model server 216 may then obtain information about listings from the listing database 214 to perform offline training to create and or modify the models (including LeafCat models) that are used by the CatReco component 202 when recommending the categories to the user. As indicated above, a language model for every category (e.g., LeafCat) is trained such that a classification recall candidate set can be re-ranked with gradient boosting machine (GBM) ensembled signals from sentence embedding similarity scores (derived using SSE modeling) and language model perplexity scores (derived using SLM). In various embodiments, the model server 216 provides functionality to train the various models used to compute the SSE-SLM-GBM CatReco results. In some embodiments, the model server 216 may obtain information for performing offline training of the SSE models.

In various embodiments SSE is used to encode a sequence of symbols (like a phrase, a sentence or a paragraph) into a continuous, dimensional vector space where semantic level similar sequences will have closer representation in this vector space. This SSE approach can automatically capture the deep latent semantic meaning of a listing title and project its semantic level meaning into a shared multi-dimensional vector space.

Deep learning has recently shown much promise in Natural Language Processing (NLP). NLP researchers in this area are trying various ways to encode a sequence of symbols (e.g., phrases, sentences, paragraphs, and documents) into a multi-dimensional vector space, called semantic space. Semantic level similar sequences will have closer representation in this multi-dimensional space. Research in this area has led to an adoption of vector space representations of sentences instead of just words. Generally, phrases or sentences better define the contextual information rather than a single word. In various embodiments, research in sentence embedding is leveraged to recommend categories for publications a seller is listing on a publication system.

In an example embodiment, SSE is used to embed the deep latent semantic meaning of a given listing title and project it to a shared semantic vector space. A vector space can be referred to as a collection of objects called vectors. Vectors spaces can be characterized by their dimension, which specifies the number of independent directions in the space. A semantic vector space can represent phrases and sentences and can capture semantics for NLP tasks.

Similarly, with a different projection function, the SSE is used to embed the deep latent semantic meaning of a given category tree path (i.e., from the top level until the leaf level) and project it to a shared semantic vector space. This SSE approach enables CatRecos which captures contextual information and deep semantic meaning from listing titles, and is capable of handling large discrepancies in words such as synonyms, typos, compound words, split word, etc.

In an example embodiment, at system run-time, an incoming listing title is projected into to the shared semantic vector space, and a listing system recommends the LeafCat which has the closest SSE representation from an offline pre-computed SSE list for the leaf categories from the categorization taxonomy used by the listing system. In another example embodiment, at system run-time, incoming listing title is projected into to the shared semantic vector space, and the listing system recommends a set of leaf categories which are used as input into other services in the listing system to generate CatReco results and scores. For example, the other services may include an SLM re-ranking service or a GBM fusion prediction service.

Various deep semantic models are trained to project semantic similar phrases to vectors close to each other and projecting semantically different phrases to vectors far apart. At training time, if a listing title T can be classified to a LeafCat $C_1$, then the projected semantic vector space value for T and $C_1$ should be the as close as possible, i.e., $\|SSE(T)-SSE(C_1)\|$ should be minimized; while, for any other leaf categories Cn, the projected semantic vector space value should be as far as possible, i.e., $\|SSE(T)-SSE(C_n)\|$ should be maximized. During training, a cosine similarity between semantic vectors may be computed. Thus, a semantic relevance between two vectors can be measured by cosine similarity.

Figure 6D:
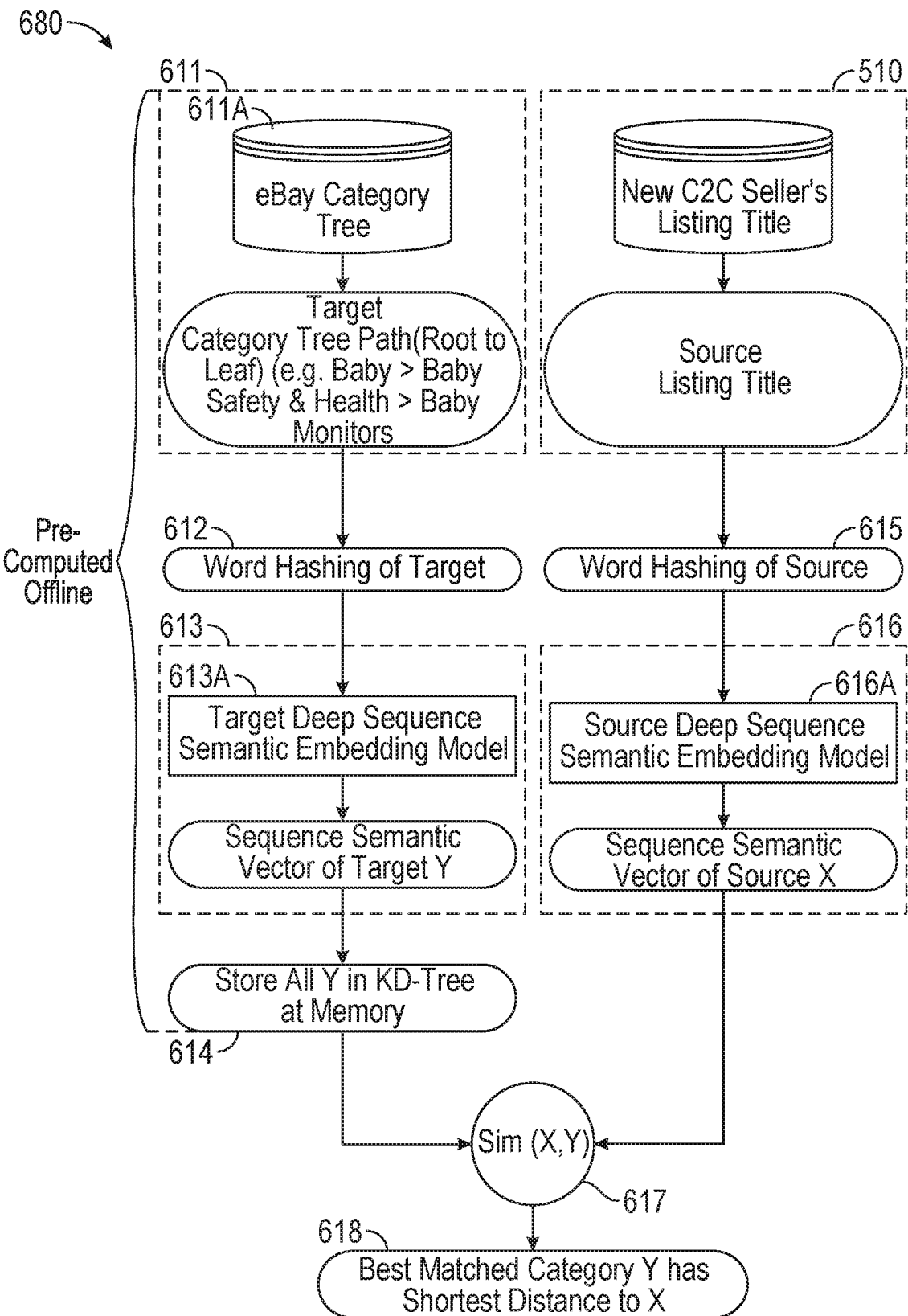
FIG. 6D illustrates a flow diagram for performing a basic SSE CatReco service, including online and offline components, according to an example embodiment.
Figure 7:
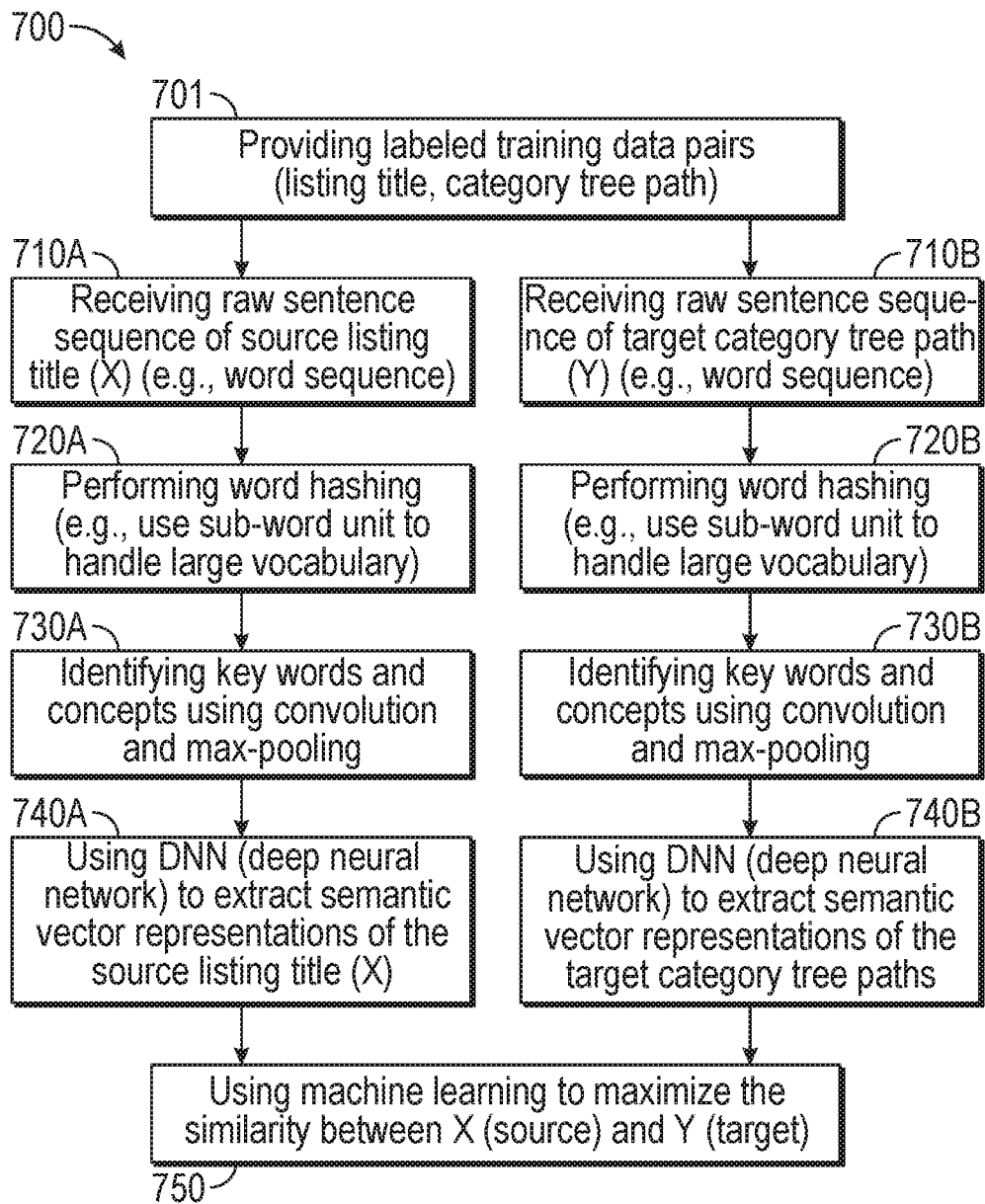
FIG. 7 illustrates a flow diagram of a method for training an SSE model for a basic SSE CatReco service in accordance with an example embodiment.
Figure 8:
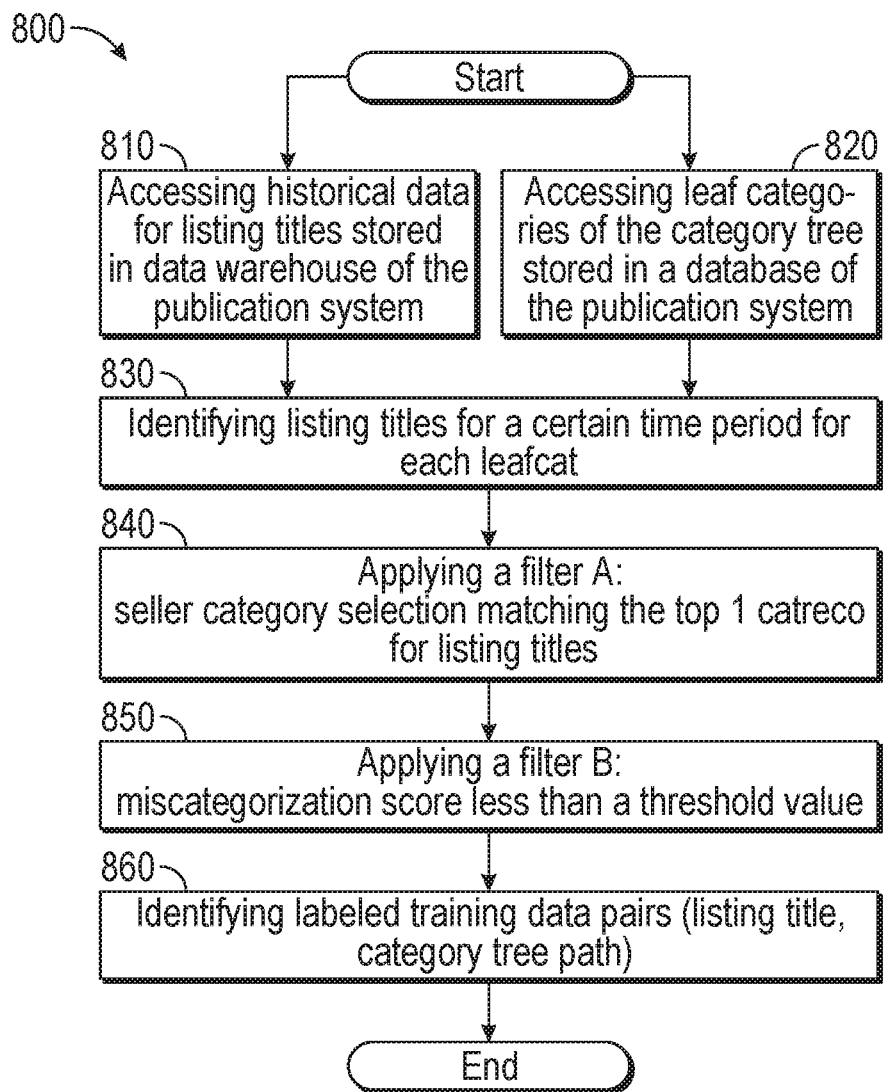
FIG. 8 illustrates a flow diagram of a method of deriving labeled training data for training an SSE model used in a basic SSE CatReco service, in accordance with an example embodiment.
Figure 9:
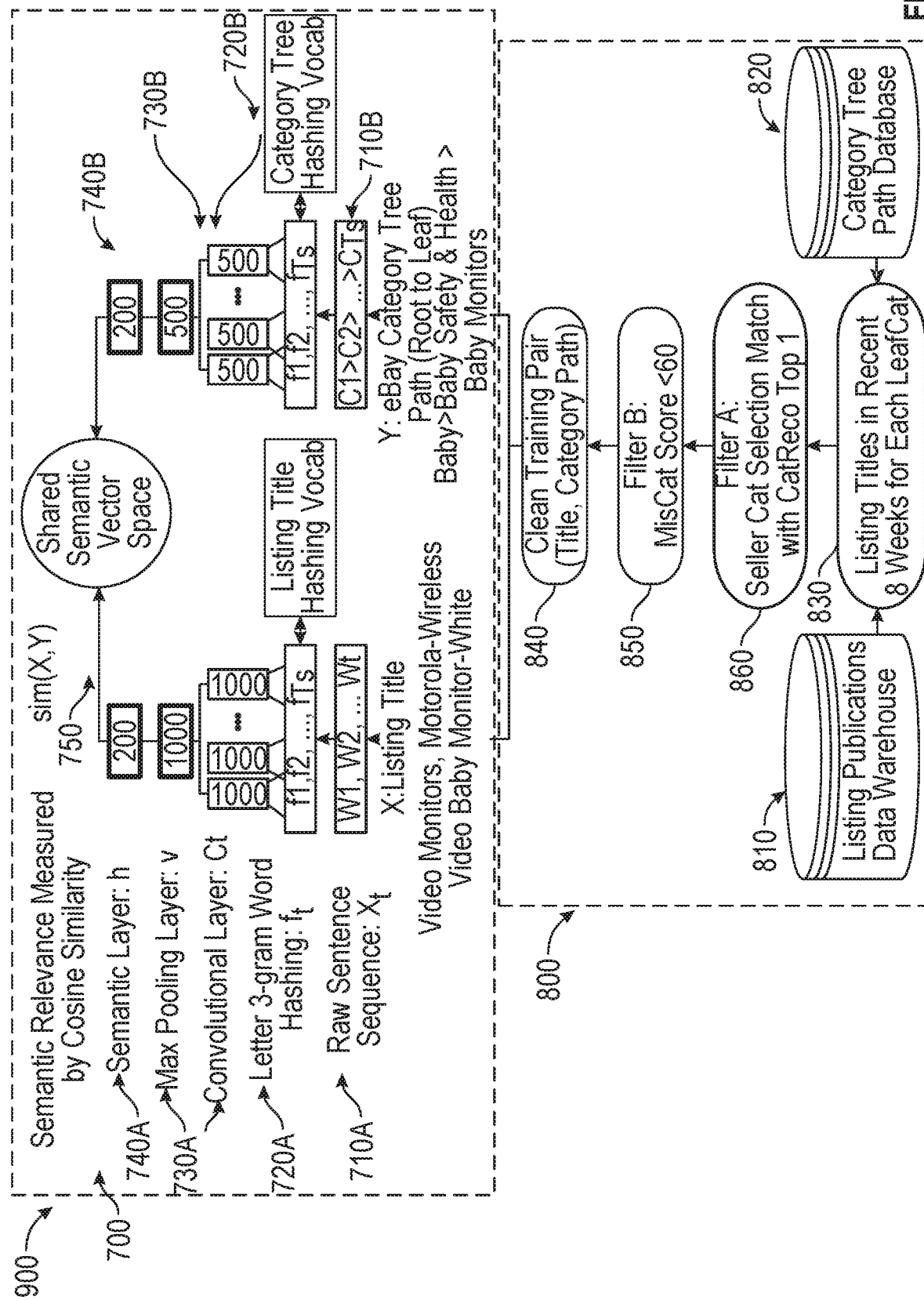
FIG. 9 illustrates a flow diagram for training an SSE model for a basic SSE CatReco service, in accordance with another example embodiment.

In various embodiments, machine learning is used to maximize the similarity between the source (X), for example, a listing title, and the target (Y), the leaf categories in category tree to generate CatRecos. A SSE model may be based on deep neural networks (DNN) and/or convolutional neural networks (CNN). DNN is an artificial neural network with multiple hidden layers of units between the input and output layers. DNN can apply the deep learning architecture to recurrent neural networks. CNN is composed of one or more convolution layers with fully connected layers (such as those matching a typical artificial neural network) on top. CNN also uses tied weights and pooling layers. Both DNN and CNN can be trained with a standard backpropagation algorithm. FIGS. 7-9 provide example flow diagrams for training SSE models. The trained SSE models are used during runtime by a basic SSE CatReco service as shown in FIG. 6D.

The SSE models require a large amount of labeled data for model training process. Obtaining vast amounts of labeled data via a manual labeling process is prohibitively expensive. This limitation can be resolved by automatically deriving clean labeled training data using parallel learning approach which leverages millions of seller's online behaviors. This parallel learning approach may be implemented using two layers of filter to automatically derive clean training data (pairs of listing title and leaf category) for SSE training. FIG. 8 illustrates an example method of identifying labeled training data pairs.

In an example embodiment, the task of CatReco given a set of keywords (from a query or listing title provided by a user such as a seller), provides an ordered list of relevant leaf categories from a category tree that represents a taxonomy used by a publication system. Based on the given set of keywords provided by the seller, the publication system recommends leaf categories that are relevant to the given set of keywords, along with some notion of order or score for each recommended leaf category. The CatReco is often one of the first steps in consumer selling flows (i.e., for listing publications) in a listing system.

According to various example embodiments, SSE, as described in various embodiments, is used to classify a listing title to a category used by a publication system. The category may represent a LeafCat (also referred to a category node) in a category tree from the taxonomy used by the publication system. Such an approach is scalable, reliable and low cost. There are a number of benefits of using SSE for CatRecos in listing system.

First of all, automatically creating training data via parallel learning framework for the SSE based CatReco reduces the cost of manually labeling training data. The automatically generated training data is based on a parallel learning framework which leverages millions of seller's behaviors and other offline available information from the publication system to ensure high accuracy for the labels.

Secondly, the SSE based CatReco eliminates dependency on a known nearest neighbor (KNN) recall set. For example, the KNN recall set may be replaced with an SSE recall set instead.

Thirdly, the out-of-vocabulary (OVV) issue can be addressed by training the SSE model at the sub-word/character level instead of at the word level. This allows the CatReco to handle a large amount of vocabulary words in addition to handling compound words, split words, typos, etc. naturally. Given that SSE is encoding the whole sequence context, modeling at the sub-word level does not lose contextual semantic information.

Fourthly, the CatReco system is able to provide a quick response during run-time since all the semantic space vector representations for all the category tree paths (e.g., 16,000 leaf categories) can be pre-computed offline in advance and also log level efficient K-dimensional (KD)-Tree algorithm can be applied to quickly identify the most matched category tree paths.

Lastly, the semantic space vector representation for any possible new LeafCat can be computed within seconds directly without need of retraining any models. This makes the SSE based CatReco system very scalable, especially, when a category tree has many updates.

In various embodiments, the taxonomy used by the publication system is represented in a category tree. In alternative embodiments, other taxonomy structures may be used. Although the example above describes CatRecos generated by a publication system, it is understood that various embodiments may be implemented in other types of online systems and not limited to publication systems.

In other example embodiments. SSE may be used to map the source (X) to the target (Y) for other NLP tasks, and not limited to mapping listing titles (e.g., source) to the category tree (e.g., target) to identify one or more leaf categories. Below is a table which lists examples of various NLP tasks along with associated sources and targets. In Table 1 below, the source

TABLE 1

| Tasks | Source (X) | Target (Y) |
|---|---|---|
| Business-to-Consumer (B2C)bulk Onboarding | Seller Taxonomy, Title | Category |
| PT Classifier | Title | Product Type |
| Front/Backend Taxonomy | Category | Product Type |
| Productization | Listing | Product |
| Category Demand | Query | Category |
| Product Type Demand | Query | Product Type |
| Left Hand Filtering | Query | Relevant Attribute Sets |
| Semantic Search | Query | Product or Listing |

FIG. 3A illustrates a user interface 300 for listing a publication according to an example embodiment. The field 310 is a text field for the seller to provide a title for the listing. In the example shown in FIG. 3A, the title "Clash of the titans movie" is provided by the seller to describe the publication for listing. The title for the listing is often a general description of the listing (and may include descriptions of attributes related to the publication). The publication system can use the title to identify one or more relevant categories for listing the publication under. The user interface element 320 presents to the seller relevant categories. In this particular embodiment, the top 3 categories are presented to the user to select the category he/she would like to list the publication under. Each of the categories represents a category leaf in a category tree for an example embodiment. According to FIG. 3A, the first category "DVDs & Movies>DVDs & Blu-ray Discs" is selected by the seller. FIG. 3B illustrates an example of the publication listing on the publication system within the category "DVDs & Movies>DVDs & Blu-ray Discs."

When SSE is applied to mapping a specific <source, target> pair, the parameters for SSE Source Model and SSE Target Model are optimized so that relevant <source, target> pair has closer vector representation distance. The following formula can be used to compute the minimum distance.

$$ScrMod^*, TgtMod^* = \operatorname{argmin} \sum_{k \text{ in all training pairs}} \|SrcVec^k - TgtVec^k\|$$

Where,
ScrSeq=a source sequence;
TgtSeq=a target sequence;
SrcMod=source SSE model;
TgtMod=target SSE model;
SrcVec=a continuous vector representation for a source sequence (also referred to the semantic vector of the source); and
TgtVec=a continuous vector representation for a target sequence (also referred to as semantic vector of the target).

The source SSE model encodes the source sequence into a continuous vector representation. The target SSE model encodes the target sequence into a continuous vector representation. In an example embodiment, the vectors each have approximately 100 dimensions.

Figure 4:
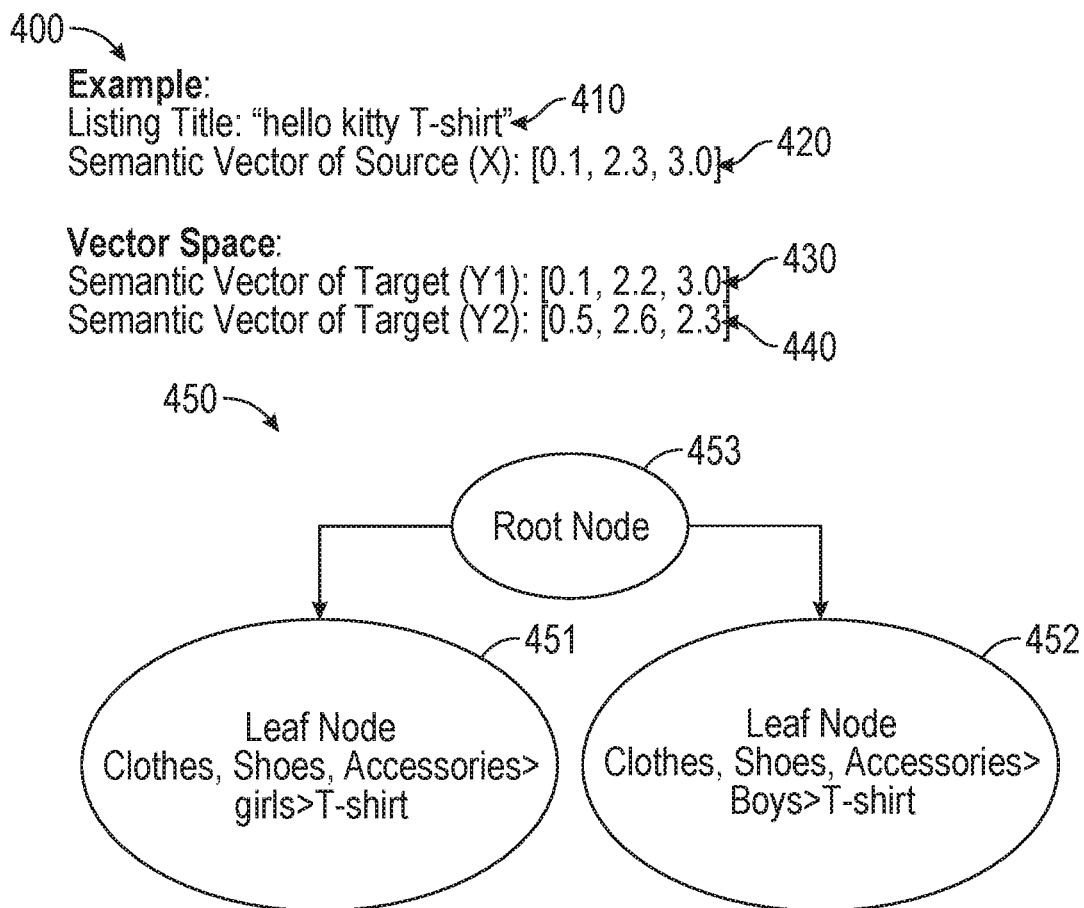
FIG. 4 illustrates a simple example of matching the source semantic vector with the closest target semantic vector.

FIG. 4 illustrates an example 400 of a listing title provided by a seller. The listing title 410 shown in FIG. 4 is "hello kitty T-shirt." In this example, three dimensions are shown. Also shown are two leaf nodes 451 and 452 of a category tree 450 having a root node 453. The source SSE model produces the semantic vector of the source (X) 420. X is represented by the vector [0.1, 2.3, 3.0]. The target SSE model produces the semantic vectors of the target (Y1 and Y2) 430 and 440. Y1 for the leaf node 451 "Clothes, Shoes. Accessories>girls>T-shirt" is represented by the vector [0.1, 2.2, 3.0] and Y2 for the leaf node 452 "Clothes. Shoes, Accessories>boys>T-shirt" is represented by the vector [0.5, 2.6, 2.3]. Based on the values of the dimensions in the vector, in this example, the listing title "hello kitty T-shirt" appears to be a closer match the leaf node 451 "Clothes, Shoes, Accessories>girls>T-shirt" rather than the leaf node 452 "Clothes. Shoes, Accessories>boys>T-shirt" based on the dimensions in the semantic vectors of the source and the target. The example shown in FIG. 4 is a very simple example with only 3 dimensions.

In other embodiments, any number of dimensions may be used. In example embodiments, the dimensions of the semantic vectors are stored in a KD tree structure. The KD tree structure can be referred to as a space-partitioning data structure for organizing points in a KD space. The KD tree can be used to perform the nearest-neighbor lookup. Thus, given a source point in space, the nearest-neighbor lookup may be used to identify the closest point to the source point.

Figure 5A:
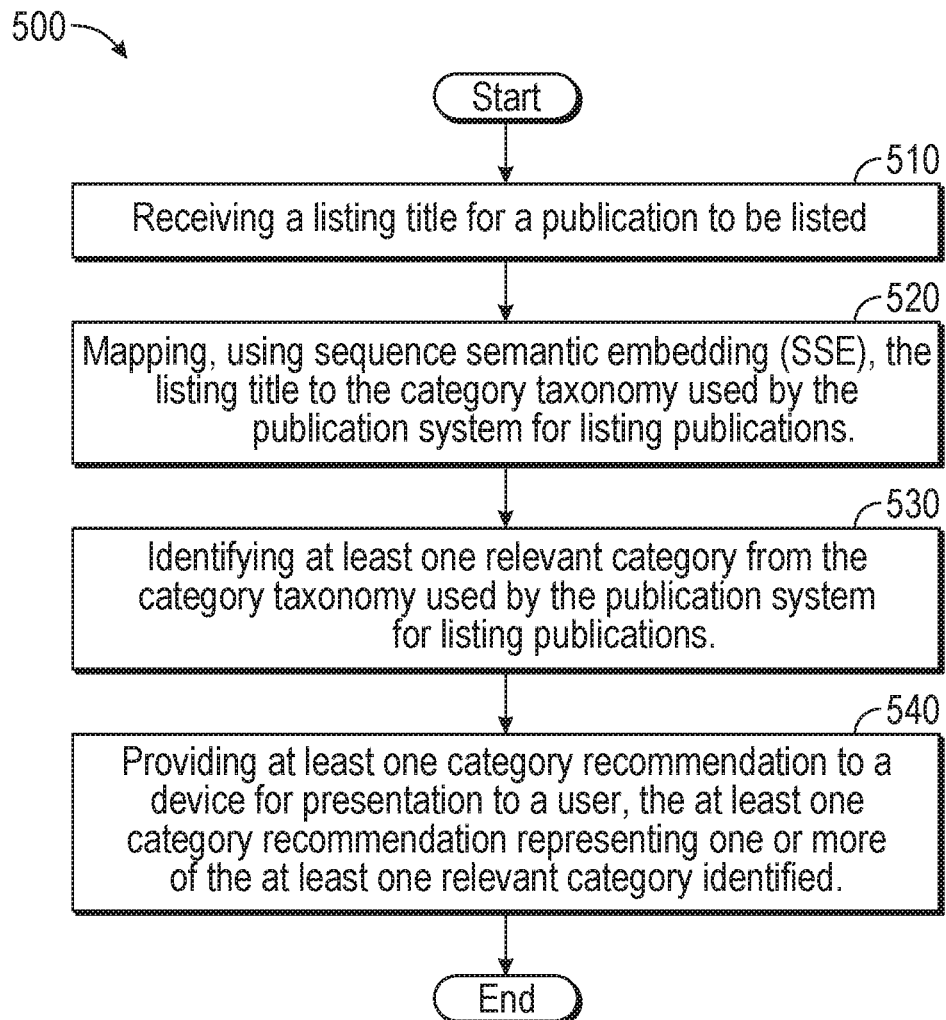
FIG. 5A illustrates a flow diagram of using SSE (Sequence Semantic Embedding) to provide at least one CatReco to a user.

FIG. 5A is a flow diagram 500 illustrating a runtime classification process to match a listing title to a category taxonomy of a system according to an example embodiment. The taxonomy used by the listing system 150 for categories may be represented by a category tree and each leaf in the category tree may represent a category. The flow diagram 500 includes the operations 510, 520, 530, and 540.

At operation 510, the listing system 150 receives a listing title for a publication. At operation 520, SSE is used to map the listing title to the category taxonomy used by the listing system 150 for listing publications. At operation 530, at least one relevant category is identified. The relevant category is identified from the category taxonomy used by the publication system for listing publications. At operation 540, at least one identified relevant category is provided to a device for presentation to a user.

Figure 5B:
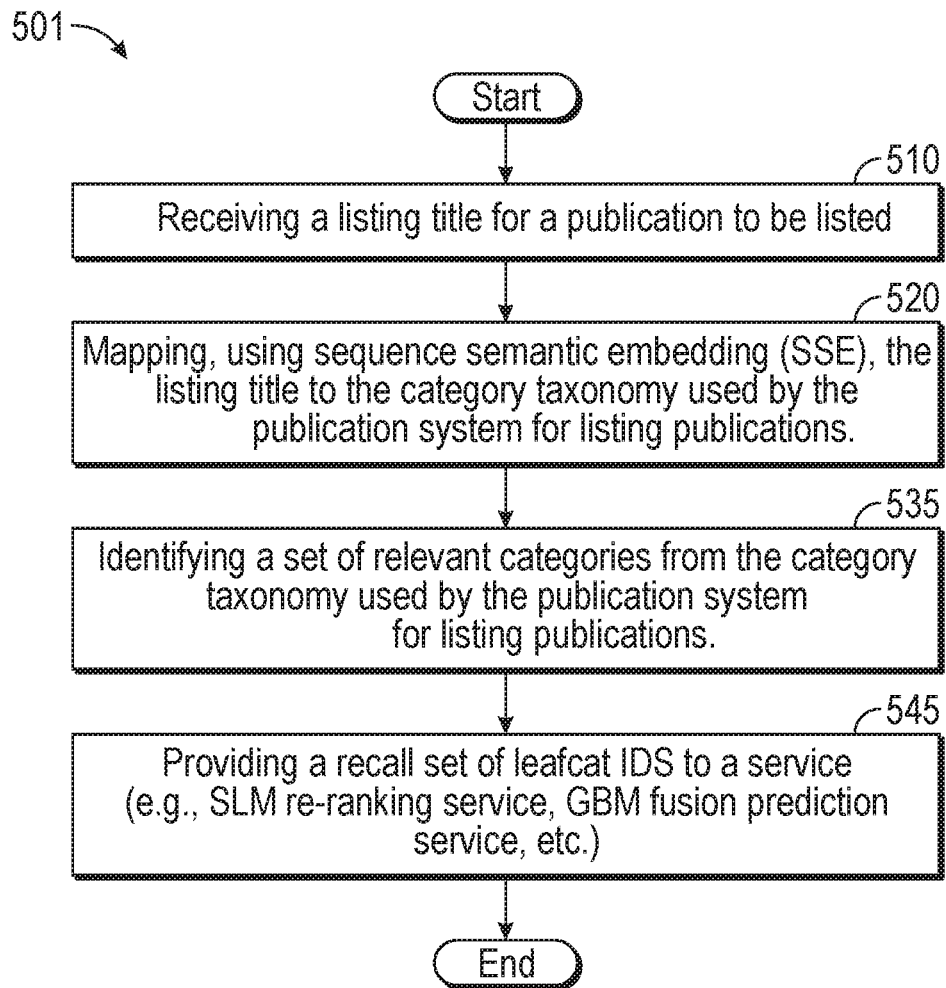
FIG. 5B illustrates a flow diagram of using SSE to provide a recall set of leaf category (LeafCat) identifications (IDs) to a service, according to an example embodiment.

FIG. 5B is a flow diagram 501 illustrating a runtime classification process to match a listing title to a category taxonomy of a system according to an example embodiment.

A recall set of leaf categories (LeafCat) identifications (IDs) is identified using SSE. The flow diagram 501 includes the operations 510, 520, 535, and 545. At operation 510, the listing system 150 receives a listing title for a publication. At operation 520, SSE is used to map the listing title to the category taxonomy used by the listing system 150 for listing publications. At operation 535, a set of relevant category is identified. The relevant categories are identified from the category taxonomy used by the publication system for listing publications. The relevant categories may represent the top N categories for the listing title received. For one example, N=50. At operation 545, a recall set of LeafCat IDs is provided to a service in the listing system 150. For example, the service may be an SLM re-ranking service or a GBM fusion prediction service.

Figure 6A:
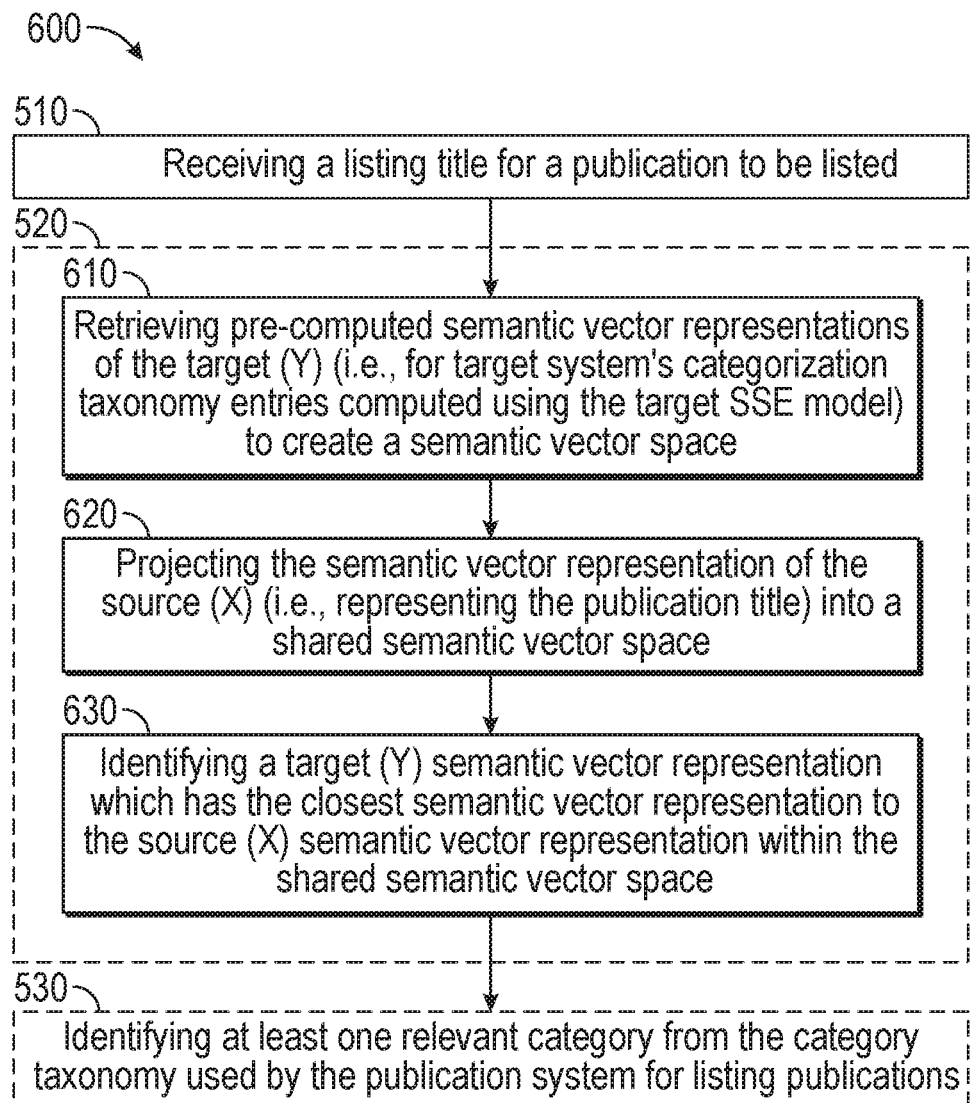
FIG. 6A illustrates a flow diagram for performing a runtime process for performing a runtime classification process for a basic SSE CatReco service, according to an example embodiment.

FIG. 6A is a flow diagram 600 illustrating the operation 520, mapping, using SSE the listing title to the category taxonomy used by the publication system for publication listings, in further detail. The mapping operation 520 includes operations 610, 620, and 630.

At operation 610, pre-computed (i.e., using the target SSE model) semantic vectors of the target (Y) are retrieved. The pre-computed semantic vectors of the target (Y) create a semantic vector space. In an example embodiment, the target system's category taxonomy entries are computed using the target SSE model. The pre-computed semantic vectors of the target (Y) are computed offline and are described in further detail in conjunction with FIG. 6B. The target SSE model encodes the target sequence into a continuous vector representation.

At operation 620, the semantic vector representation of the source (X) is projected into a shared semantic vector space. The semantic vector space created with the sematic vectors of the target (Y) is combined with the semantic vector of the source (X) to create a shared semantic vector space. The source SSE model is used to create the semantic vector representation of the listing title.

At operation 630, the target (Y) semantic vector representation (of a categorization entry) which has the closest semantic vector representation to the source (X) semantic vector representation (of the listing title) within the shared semantic vector space is identified. The categorization entry can represent a LeafCat. The semantic relevance, sim(X,Y), is computed using a cosine similarity function in an example embodiment. An example of sub-operations for operations 620 and 630 are described in conjunction with FIG. 6C.

Figure 6B:
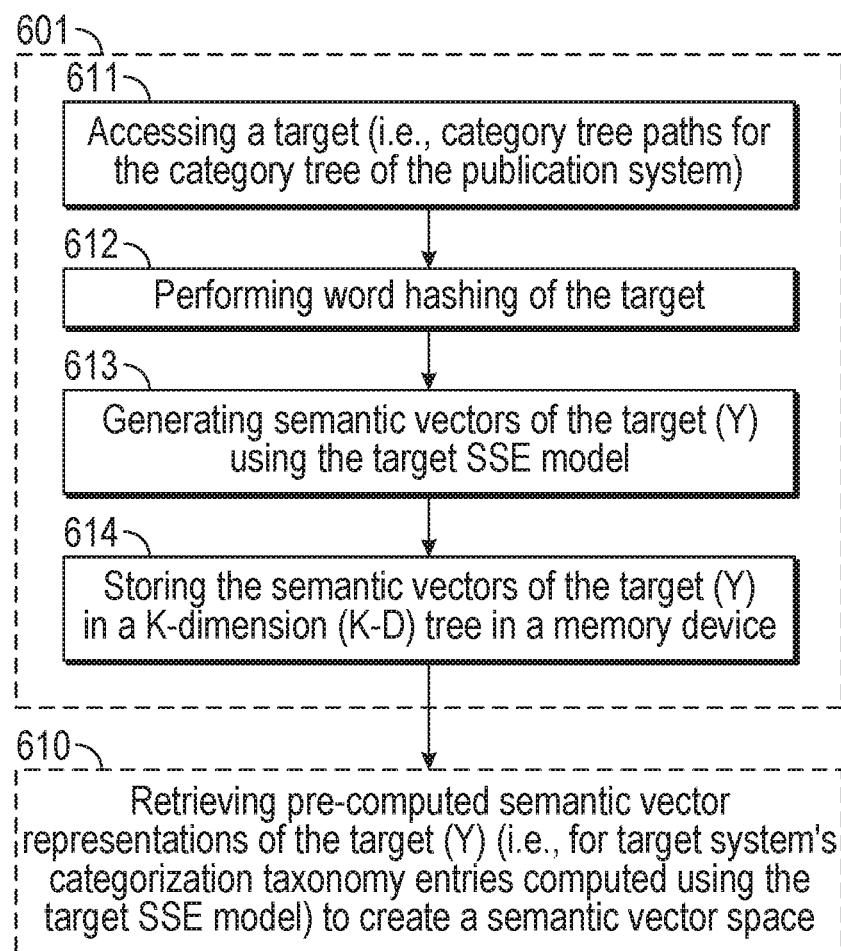
FIG. 6B illustrates a flow diagram for performing an offline process for pre-computing semantic vectors of the target for a basic SSE CatReco service, according to an example embodiment.

As shown in FIG. 6B, the flow diagram 601 includes the operations 611-614. According to FIG. 6B, the pre-computed semantic vectors of the target (Y) are retrieved at operation 610.

At operation 611, the target is accessed. For an example embodiment, the target represents the paths for the category tree of the listing system 150 is accessed. The path represents the root to the LeafCat. For an example embodiment, the category tree paths are accessed from a database from the listing system 150.

At operation 612, word hashing is performed on the category tree paths from the target. In an example embodiment, the word hashing is performed using a letter-trigram. The letter-trigram based word hashing takes the original phrase (e.g., root to leaf path), preprocesses (e.g., add # to the empty spaces) and identifies the tri-letters. The word hashing can be used to create compact representations of a large vocabulary. For example, a vocabulary of 500,000 can be reduced to 30,000 letter-trigrams. The word hashing creates a listing system 150, or other system, that is robust to misspellings, inflections, compounds, split words, etc. Additionally, unseen words can also be generalized using the word hashing.

At operation 613, the target SSE model is used to generate semantic vectors (also referred to as the semantic vector representations) of the target.

At operation 614, the semantic vectors of the target is stored in a KD tree in a memory device 614. In example embodiments, the dimensions of the target semantic vectors are stored in a KD tree structure. In an example embodiment, the target semantic vectors represent vectors for each of the LeafCat in a category tree. The leaf categories may be represented as leaf nodes, such as those shown in FIG. 4. One example of a category tree for a listing system 150 includes over 19,000 category tree paths (e.g., root to leaf).

Figure 6C:
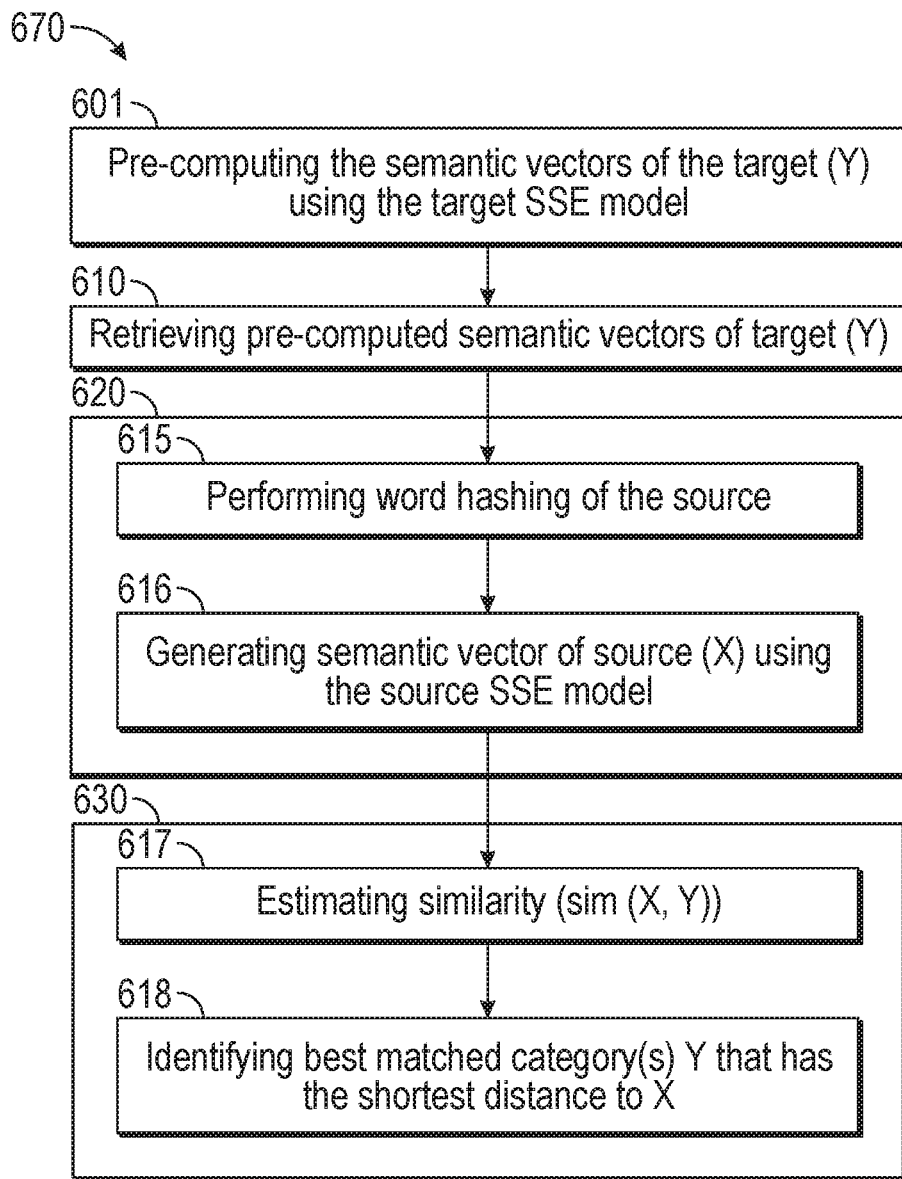
FIG. 6C illustrates a flow diagram for performing a runtime classification process for a basic SSE CatReco service, according to another example embodiment.

By pre-computing the target semantic vectors, the process of mapping the source semantic vector representing the listing title, can be computed very quickly. In various embodiments, the target sequence is pre-computed before runtime (as shown by operation 601 in FIG. 6B) and the source sequence vector is computed during runtime and then compared to the target sequence vectors during runtime. FIG. 6C illustrates a flow diagram 670 which combines the offline process of computing the target sequence vectors with the runtime process to compute the source sequence vector such that the listing title can be mapped (i.e., by using SSE models and computing the semantic relevance (e.g., using a cosine function) between the source and target semantic vectors) to the category taxonomy used by the listing system 150.

As shown in FIG. 6C, the flow diagram 670 includes the offline operation 601 and the run time operations 610, 620 and 630. The offline operation 601 was shown in FIG. 6B. The runtime operations 610, 620 and 630 were shown in FIG. 6A. The operation 620 (to project the semantic vector representation of the source (X) into a shared semantic vector space) includes the sub-operations of 615 and 616. The operation 630 (to identify the target (Y) semantic vector representation (of a categorization entry) which has the closest semantic vector representation to the source (X) semantic vector representation (of the listing title) within the shared semantic vector space) includes the sub-operations of 617 and 618.

As shown in FIG. 6C, the semantic vector representations of the target are computed offline at operation 601. At operation 610, the pre-computed semantic vectors of the target are retrieved.

At operation 615, word hashing is performed on the source. In an example embodiment, the source represents a listing title for a listing. At operation 616, the semantic vector of the source is generated using the source SSE model. In an example embodiment, the combined operations 615 and 616 are used to project the semantic vector representation of the source into a shared semantic vector space (as shown by operation 620).

At operation 617, the relevance similarity, sim (X,Y) is estimated. At operation 618, the best matched category Y (represented as a target semantic vector) that has the shortest distance to X (represented as a source semantic vector) is identified. In an example embodiment, the combined operations 617 and 618 are used to identify the target (Y) semantic vector representation (of a categorization entry) which has the closest semantic vector representation to the source (X) semantic vector representation (of the listing title) within the shared semantic vector space (as shown by operation 630).

As described above, the mapping is can be performed by learning the semantic similarity, sim (X,Y), between a source sequence vector and a target sequence vector in various embodiments. In example embodiments, the semantic similarity, also referred to as semantic relevance, may be measured by a cosine similarity function sim (X, Y). In some embodiments, X represents the source sentence sequence (i.e., derived from the seller's title) and Y represents the target sentence sequence (i.e., i.e., derived from the category tree of the listing system 150). The output of the cosine similarity function represents a shared semantic vector space. Generally, the best matched category of Y has the highest similarity score to X. The source sequence and target sequence represent computed vector sequences, each having a number of dimensions.

FIG. 6D shows a flow diagram 680 illustrating the SSE runtime classification process according to an example embodiment. The SSE runtime classification process shown in FIG. 6D is used to classify a listing title by mapping the listing title to the category taxonomy of a listing system 150. As described above, the flow diagram 680 may be used to perform a number of tasks by mapping sources to targets, such as those identified in the Table 1 above. The basic SSE runtime classification process shown in FIG. 6D can also be referred to as the basic SSE categorization recommendation (CatReco) service 680. The basic SSE categorization service 680, represents an SSE runtime decoding process to get a recall set and similarity scores. In an example embodiment, the recall set represents a set of N top leaf nodes in a category tree. The recall set and similarity scores may be used by a CatReco component 202 (shown in FIG. 2) to generate an SSE-SLM-GBM CatReco results. The generation of the SSE-SLM-GBM CatReco results is described below in conjunction with FIG. 10.

The flow diagram 680 includes operations 611-618 and 510. The operations 611-614 were previously described in conjunction with FIG. 6B. The operations 615-618 were previously described in conjunction with FIG. 6C. The operation 510 was previously described in conjunction with FIG. 5.

The operations 611-14 describe the offline process used to compute the sequence semantic vectors of the target which are stored in a KD tree structure. The KD tree is accessed during runtime such that the sequence semantic vector of the source can be projected into a shared semantic vector space with the sequence semantic vectors of the target. The relevance similarity, sim (X, Y) is estimated (at operation 617) and the best matched category Y, which has the shortest distance to X (at operation 618), is identified. The best matched category Y may be referred to as the Top 1 category in the category tree that matches the listing title for the listings. In various embodiments, the TOP "N" categories are identified such that a number of the N categories can be presented to the user. For example, in FIG. 3A, the top 3 categories is presented to a user (e.g., listing seller) in user interface 300.

In an example embodiment, the target deep SSE model 613A and the source deep SSE model 616A is trained using the SSE model training process described in FIGS. 7-9.

In an example embodiment, the CatReco task is used to classify the listing title provided by a user to a LeafCat. Classifying a listing title can be challenging when there is a large number of categories. The CatReco task is often used by the various selling flows of a listing system 150. For an example embodiment, a listing system 150 may have over 19,000 different categories in the United States. Listing systems often work on improving the accuracy of selecting a most relevant category from over 19,000 categories based on a set of keywords provided by a user and response time in generating or presenting CatReco to the listing seller.

FIGS. 7-9 illustrate a training process for the SSE models used by the basic SSE CatReco service 680, according to example embodiments. An embodiment of the SSE runtime classification process is shown in FIG. 6D, and can be referred to as a basic CatReco SSE service 580 when used to perform the CatReco task by mapping the listing title to the category tree paths of the listing system 150. FIG. 7 illustrates a flow diagram 700 for the SSE training model according to an example embodiment. FIG. 8 illustrates a flow diagram 800 for actively identifying labeled training data pairs that are used by the SSE training model (shown in FIG. 7) according to an example embodiment. FIG. 9 illustrates an example of an SSE model training process which includes the various operations and components shown in FIGS. 7 and 8.

Referring to FIG. 7, the source SSE model and the target SSE model are trained. The operations 710A, 720A, 730A, and 740A are used to train the source SSE model. The operations 710B, 720B, 730B, and 740B are used to train the target SSE model. At operation 701, labeled training data pairs (listing title, category tree path) are provided for training both the source SSE model and the target SSE model. In an example embodiment, the labeled training data pairs are identified using the flow diagram 800 shown in FIG. 8.

At operation 710A, the raw sentence sequence of the source listing title (X) is received. The source listing title (X) may represent a word sequence provided by the listing seller. At operation 720A, word hashing is performed on the source listing title (X). In situations where there is a very large vocabulary word, hashing is performed on a sub-word unit. In various embodiments, letter 3-gram word hashing is performed.

In an example embodiment, the convolution layer, the maximum pooling layer, and the semantic layer represent neural network layers. A number of nodes (e.g., 500 nodes as shown in FIG. 9) may be configured in those neural network layers. In other embodiments, the number of nodes may be changed or configured to a different number, depending on the data size. At operation 730A, key words and concepts are identified from the source listing title (X) using convolution and max-pooling.

At operation 740A, a deep neural network (DNN) is used to extract semantic vectors representations of the source listing title (X). The DNN uses more than one neural network layer to project input sequences into a semantic vector space.

At operation 710B, the raw sentence sequences of the target category tree paths (Y) is received. For an example embodiment, a listing system 150 is used to list publications and may include over 19,000 category tree paths (Y) or CatLeafs. At operation 720B, word hashing may be performed on the target category tree paths (Y). In situations where there is a very large vocabulary word, hashing is performed on a sub-word unit. In various embodiments, letter 3-gram word hashing is performed.

In an example embodiment, the convolution layer, the maximum pooling layer, and the semantic layer represent neural network layers. A number of nodes (e.g., 500 nodes as shown in FIG. 9) may be configured in those neural network layers. In other embodiments, the number of nodes may be changed or configured to a different number, depending on the data size. At operation 730B, key words and concepts are identified from the target category tree paths (Y) using convolution and max-pooling.

At operation 740, a deep neural network (DNN) is used to extract semantic vectors representations of the target category tree paths (Y). The DNN uses more than one neural network layer to project input sequences into a semantic vector space.

At operation 750, Semantic vector distance between X and Y is used to measure the similarity between the semantic vectors representations of the source listing title (X) and the semantic vector representations of the target category tree paths (Y). In an example embodiment, the semantic relevance, represented by the function sim (X, Y), is measured by cosine similarity.

When both the source SSE model and the target SSE model are trained out, the semantic vector representations for all of the category taxonomy entries of the target can be pre-computed in advance using the target SSE model. Additionally, when there is a need to map any new publication listing from a seller, the semantic vector representation of the listing title can be projected into shared semantic vector space with the semantic vectors representations of the category tree paths from the category taxonomy of the listing system 150. For an example embodiment, the correct mapping for a listing title will be the category tree path having the closest semantic vector representation to the semantic vector representation of the listing title.

As indicated above, when SSE is applied to mapping a specific <source sequence, target sequence> pair, the parameters for SSE Source Model and SSE Target Model are optimized so that relevant <source, target> pair has closer vector representation distance. The following formula can be used to compute the minimum distance.

$$ScrMod^*, TgtMod^* = \operatorname*{argmin}_{k \text{ in all training pairs}} \sum \|SrcVec^k - TgtVec^k\|$$

Where,
ScrSeq=a source sequence;
TgtSeq=a target sequence;
SrcMod=source SSE model;
TgtMod=target SSE model;
SrcVec=a continuous vector representation for a source sequence (also referred to the semantic vector of the source); and
TgtVec=a continuous vector representation for a target sequence (also referred to as semantic vector of the target).

The source SSE model encodes the source sequence into a continuous vector representation. The target SSE model encodes the target sequences into a continuous vector representations. In an example embodiment, the vectors each have approximately 100 dimensions.

Trained SSE modules are used to implement the runtime classifications. In various embodiments, the training of the SSE models is performed offline with training data, for example, the labeled training data pairs. In some embodiments, labeled training data is automatically derived. For example embodiments, each labeled training sample is represented by a pair <source sequence, target sequence>. In an example embodiment, the source sequence represents the title of a publication listing. The target sequence represents a LeafCat by the category tree path of the category taxonomy used by the listing system 150.

Generally, good natural language processing and machine learning methods require labeled training data (i.e., supervised learning). Training the SSE modules with millions of labeled training data samples increases the accuracy of mapping results. In various embodiments, the SSE models are trained using already onboarded publication listings in the listing system 150. The existing publication listings already onboarded enables the SSE models to be quickly trained with relevant data. For example, a company such as eBay, Inc. located in San Jose Calif., has access to billions of already onboarded publication listings with its seller's inventory taxonomy information recorded in a data warehouse. This already onboarded publication listings can be processed to mine, join, and filter out millions of such labeled training data based on eBay's previous transaction data.

FIG. 8 illustrates a flow diagram 800 of a method of deriving labeled training data according to an example embodiment. At operation 810, historical data from listing titles stored in a data warehouse of the publication system 142 is accessed. The historical data related to previous publication listings onboarded by sellers is accessed, which may be stored in a data warehouse from the publication system 142. For various embodiments, the historical data related to the previous publication listings includes listing titles and the category selected by the listing seller during the listing process.

At operation 820, the LeafCat of the category tree stored in a database of the publications system is accessed. In an example embodiment, the LeafCat may include over 19,000 entries.

Training data that includes the listing title and the category tree paths of a LeafCat based on the category taxonomy of the listing system 150.

At operation 830, for a certain time period (e.g., every eight weeks), the listing titles for each LeafCat is identified. The data accessed by operations 810 and 820 is used to identify the listing titles for each leaf category.

The training data is then filtered by applying a filter A at operation 840, and applying a filter B at operation 850. By using filters A and B, the listing system 150 checks if the seller's choice of category matches with the first recommendation from the CatReco component 202 of the listing system 150. If there is a match, then the listing system 150 checks if the listing miscategorization (miscat) score is low. A low score often indicates that the listing publication was miscategorized into a wrong LeafCat. An example of a low score may be 50. If a listing publication passed both filters A and B, this pair of (listing title, category tree path) is treated as a clean training sample.

At operation 860, the labeled training data pairs (listing title, category tree path) is identified. In various embodiments, this is an automated process to identify labeled training pairs used by the training process to implement active learning. The method shown in the flow diagram 800 may be automated such that labeled training data pairs are identified on a regular basis and used to actively train the SSE model process, via machine learning, as shown by a flow diagram 900 in FIG. 9.

FIG. 9 illustrates the SSE model training process and combines the flow diagram 700 (shown in FIG. 7) and the flow diagram 800 (shown in FIG. 8) in an example embodiment. One important goal of the SSE model training process to try to obtain an optimized source SSE model and an optimized target SSE model such that for all training sample pairs, the distance between a continuous vector representation of the source sequence and a continuous vector representation of the target sequence is minimized. In various embodiments, machine learning is used to optimize the source SSE model and the target SSE model to achieve this goal of minimizing this distance.

FIG. 9 illustrates the flow diagram 900 according to an example embodiment. The method shown in FIG. 9 includes the operations 710A-740A. 710B-710B, and 750 (which were described in conjunction with FIG. 7), and the operations 810-860 (which were described in conjunction with FIG. 8).

According to FIG. 9, the clean training pair (listing title, category tree path) is used to train the source SSE model and the target SSE models. The training pair can be referred to as a clean training pair because the process of generating the training pair filters out miscategorized pairs using the filters A and B (at operations 840 and 850). In one example, the listing title is "Video Monitors, Motorola—wireless video baby monitor—white." The category tree path is "Baby>Baby Safety & Health>Baby Monitors." The listing title from the training pair is provided as input into the source SSE model, and the category tree path from the training pair is provided as input into the target SSE model. In an example embodiment, the semantic relevance measured by cosine similarity (of the source semantic vector of the listing title and the target semantic vector of the category tree path in the training data) is referred to as a similarity score. In an example embodiment, a machine learning system within the CatReco component 202 uses the clean training pairs (identified at operation 860) to train the source SSE model and the target SSE model.

For an example embodiment, the basic SSE runtime classification process provided by the basic SSE CatReco service 680 (as shown in FIG. 6D) utilizes the target deep SSE model 613A trained with the SSE model training process and the source deep SSE model 616A trained with the SSE model training process 900 (shown in FIG. 9).

Although the SSE model training process shown in FIG. 9 illustrates training the source and target SSE models using a labeled training pair (listing title, category tree path) with the listing title "Video Monitors, Motorola—wireless video baby monitor—white" and the category tree path is "Baby>Baby Safety & Health>Baby Monitors," the SSE model training process shown in FIG. 9 can be used to train other types of labeled training pairs. For example, a label training pair (listing title, product type tree path) or a labeled training pair (category tree path, product type tree path) may be used when performing other types of tasks, such as those shown in Table 1 above.

Figure 10:
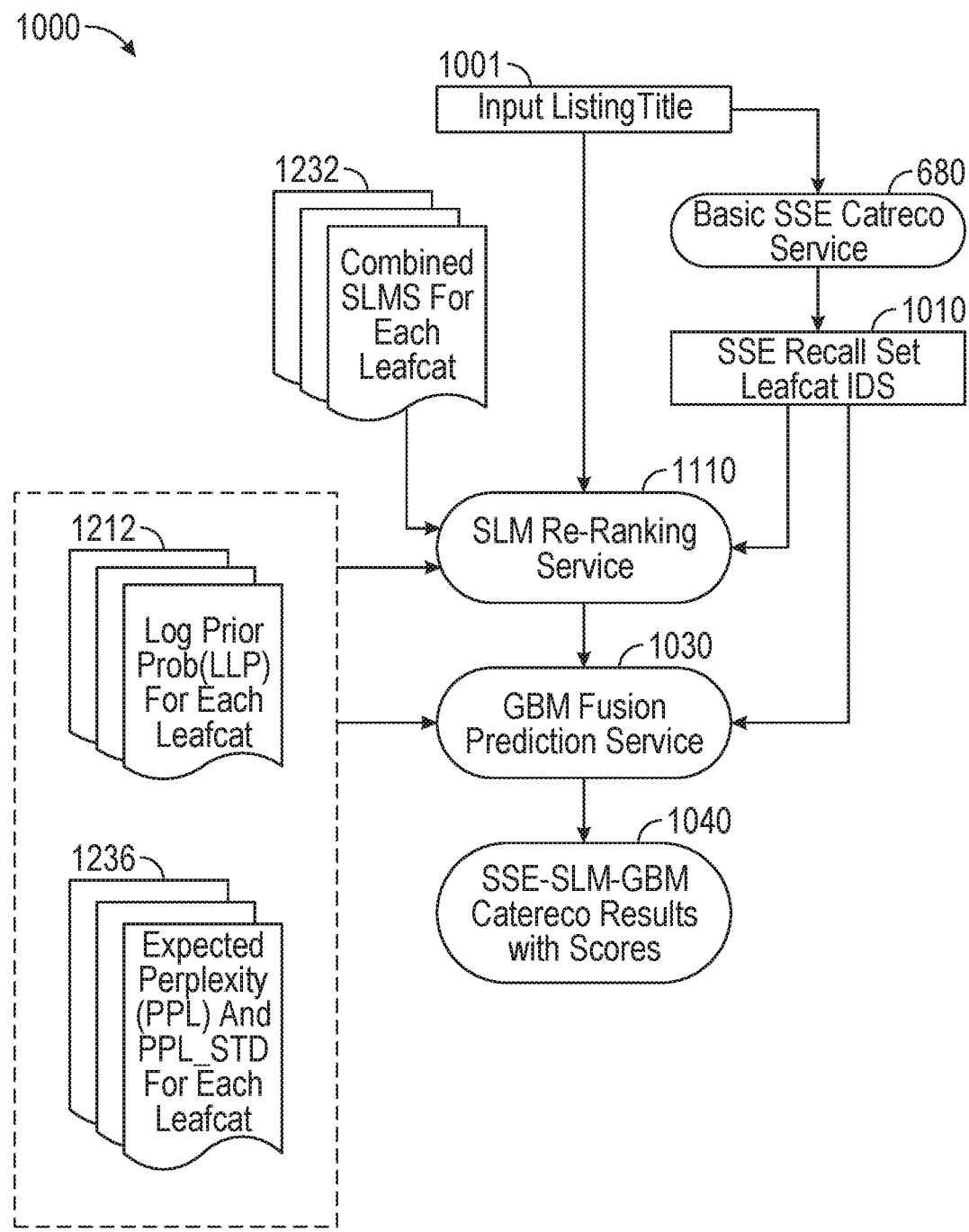
FIG. 10 illustrates a flow diagram for performing an SSE-statistical language modeling (SLM)-a gradient boosting machine (GBM) runtime process to generate CatReco, in accordance with an example embodiment.

In various embodiments, a CatReco component 202 of a listing system 150 (shown in FIG. 2) may utilize the basic SSE CatReco service 680 in combination with using statistical language modeling (SLM) provided by a SLM re-ranking service 1110 and a gradient boosting machine (GBM) fusion prediction service 1030. The SLM re-ranking service 1110 and the GBM fusion prediction service 1030 may also be performed by the listing system 150 in an example embodiment. A high level block diagram of an SSE-SLM-GBM approach according to an example embodiment is shown in FIG. 10. The flow diagram 1000 shown in FIG. 10 illustrates a process for generating an SSE-SLM-GBM CatReco results with scores.

In various example embodiments, SLM is used to improve accuracy of the recommendations provided by the CatReco component 202. SLM is a data-driven modeling approach that attempts to qualify the likelihood of a given text input, such as a sentence, listing title, or search query. SLM is able to leverage vast amounts of unsupervised text data (e.g., text data that is unlabeled and thus does not have obvious structure). In an example embodiment, SLM is used to train a language model for each LeafCat based on an unsupervised listing title, and then a new listing title's sentence log probability (SLP) is evaluated using the appropriate LeafCat's language model. This may be repeated for each candidate LeafCat. In various embodiments, the re-ranking process for a ranking of suggested categories is performed after the basic SSE CatReco Service 680 has generated similarity scores and a SSE recall set. The recall set may represent a top N categories produced by the basic SSE CatReco service 680.

Notably, in an example embodiment, only the categories listed in the top N leaf categories (identified by the basic SSE CatReco Service 680) are evaluated using the SLM re-ranking service 1110. This can be significantly more efficient than running the SLM algorithm on all possible categories (e.g., over 19,000 leaf categories).

Additionally, in an example embodiment, a GBM is used to combine predictions of several estimators in order to further refine the suggested categories, fusing together various scores and data as described below.

According to FIG. 10, a title for a publication listing is received at operation 1001. The title for the publication listing is provided to the Basic SSE CatReco Service 680 and a SLM Re-ranking service 1110.

The basic SSE CatReco Service 680 is used to identify the top N LeafCats which are defined by in an SSE recall set of LeafCat IDs 1010 for the listing title. The SSE recall set of LeafCat IDs 1010 is provided as input into a SLM re-ranking service 1110. In an example embodiment, the SLM re-ranking service 1110 includes two components—a SLM runtime classification stage 1110A (shown in FIG. 11) and SLM training stage 1110B (shown in FIG. 12).

Rather than using a k nearest neighbor (KNN) algorithm on the input text string (e.g., representing a title of a publication listing) to identify a set of leaf categories, the basic SSE CatReco Service 680 is used to identify the set of leaf categories (i.e., top N LeafCat). The set of leaf categories (defined by SSE recall set of LeafCat IDs 1010) is reordered (by the SLM re-ranking service 1110) based on a SLM algorithm performed on the input text string, a combined SLM for each LeafCat 1232, the log likelihood probability (LLP) for each LeafCat 1212, the expected perplexity and standard deviation (also referred to as expected PPL and PPL_Std) for each LeafCat 1236. LLP and PPL will be discussed in further detail in conjunction with FIG. 11.

At operation 1030, the GBM fusion prediction service 1030 receives as input, the SSE recall set LeafCat IDS 1010, the LLP for each LeafCat 1212, expected PPL and PPL_Std for each LeafCat 1236, and the output from the SLM re-ranking service 1110 (i.e., the reordered set of LeafCat). At operation 1030, the GBM fusion prediction service 1030 is then used to fuse the various inputs received to calculate an ordered list of recommended LeafCats with corresponding scores. The results of the GBM Fusion Prediction is shown at 1040.

Figure 11:
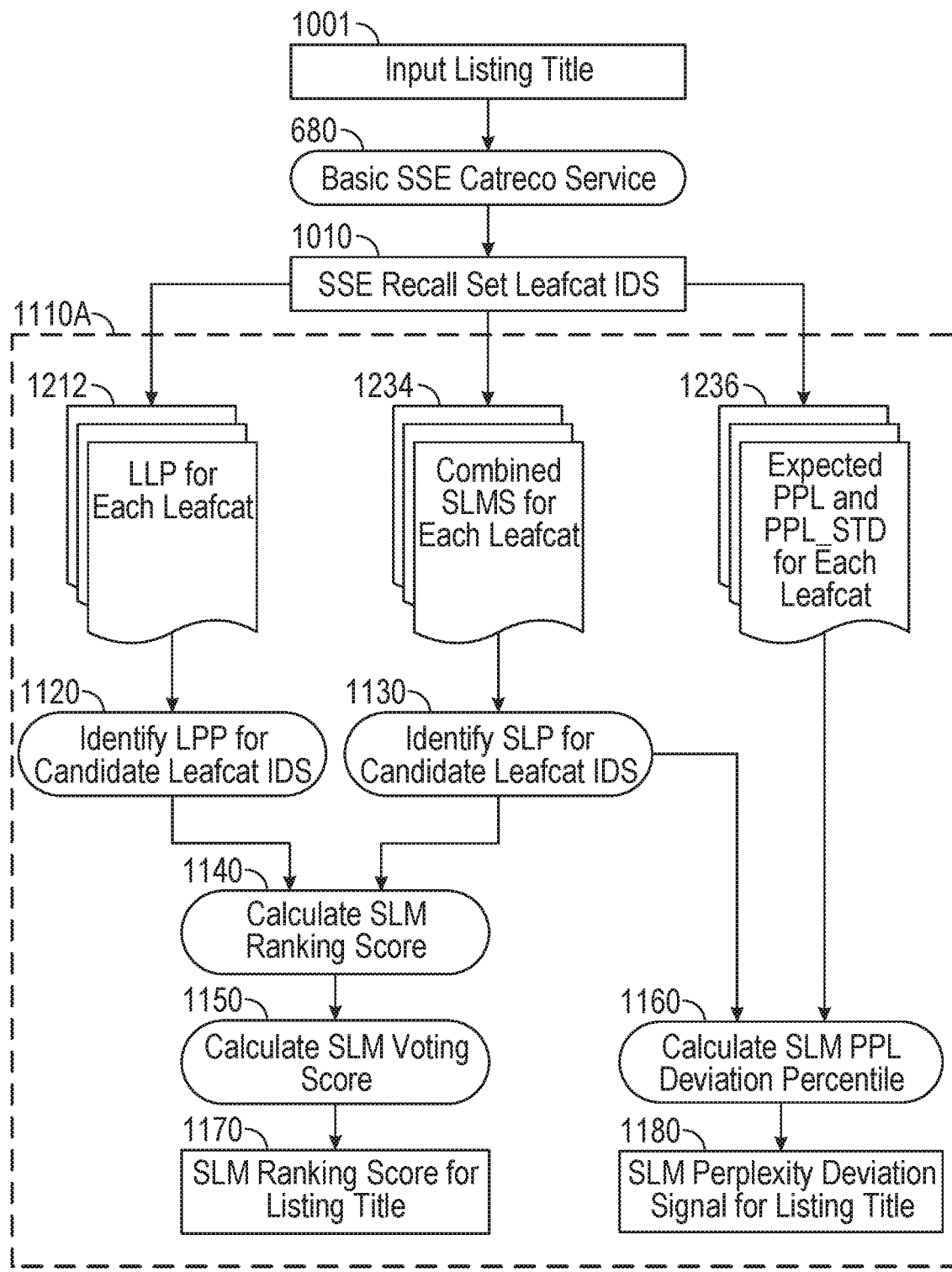
FIG. 11 illustrates a flow diagram for performing an SSE-SLM re-ranking runtime process, in accordance with an example embodiment.

FIG. 11 is a diagram illustrating an SLM runtime classification stage 1110A of the SLM re-ranking service 1110 in accordance with an example embodiment.

According to FIG. 11, an input listing title 1001 is provide to the basic SSE CatReco service 680. The basic CatReco service 680 generates an SSE recall set of LeafCat identifications (IDs) 1010 that is provided as input into the SLM runtime classification stage 1110A.

The LLP for each LeafCat 1212, the combined SLM for each LeafCat 1232, and the expected PPL and PPL_Std for each LeafCat 1236, are accessed by the SLM runtime classification stage 1110A. More specifically, the LLP for each LeafCat 1212 is pre-calculated offline and stored in a file, and is loaded into memory at runtime. The combined SLMs for each LeafCat 1234 is the SLM model for each LeafCat, which is pre-trained offline and loaded into memory at runtime. The expected PPL and PPL_STD for each LeafCat 1236 is also pre-calculated offline during the model training process and saved into a file and loaded into memory at runtime. The pre-calculation of the LLP for each LeafCat 1212, the combined SLM for each LeafCat 1232, and the expected PPL and PPL_Std for each LeafCat 1236 are described in further detail together with FIG. 12.

At an SLM runtime classification stage 1110A, deep signals are calculated to measure how far away a given listing has deviated from the assigned leaf category. Assume that a runtime publication listing title is T, the seller has placed it under category C, and the publication's runtime perplexity is computed as PP(T). Its deviation signal is computed as:

$$\text{Deviation\_PP}(C, T) = \frac{PP(T)}{\text{Mean\_PP}(C) + \alpha * \text{STD\_PP}(C)}$$

where $\alpha$ is a parameter that can be fine tuned (in an example embodiment it is set at 2.0).

Finally, the Mean_PP(C), STD_PP(C), PP(T), and Deviation_PP(C,T) can be fed as deep features into the GBM model along with traditional shallow features such as price, condition, CatReco score, and so forth to produce a ensemble model.

The LLP for candidate LeafCat IDs is identified based on the LLP for the LeafCat 1212 at operation 1120. The candidate LeafCat IDs is based on the SSE recall set of LeafCat IDs.

The SLP for the candidate LeafCat IDs is identified based on the combined SLMs for each LeafCat 1234 at operation 1130. The candidate LeafCat IDs is based on the SSE recall set of LeafCat IDs.

The output of the operation 1120 (i.e., the identified LLP for candidate LeafCat IDs) and the output of the operation 1130 (i.e., the identified SLP for candidate LeafCat IDs) is used as input to calculate the SLM ranking score at operation 1140. The SLM ranking score is used at input into operation 1150. At the operation 1150, the SLM voting score is calculated based on the SLM ranking score. At operation 1150, the SLM ranking score for the listing title is produced.

In an example embodiment, the SLM ranking score (SRS) for each LeafCat is calculated by adding together the (weighted) individual SLP scores and LPP scores, such as by using the formula SRS=SLP+1.8*LPP. In an example embodiment, the SLM voting score is calculated by dividing one by the sum of one and the difference between the maximum SRS score and the individual SRS score for a leaf category, such as by using the formula SLM Voting Score=1/(1+Max_SRS−SRS).

At operation 1160, the identified SLP for candidate Leaf-Cat IDs and the expected PPL and PPL_Std for the LeafCats from the SSE recall set of LeafCat IDs are used as input to calculate the SLM PPL deviation percentile at operation 1160. At operation 1160, a SLM perplexity deviation signal for the listing title is produced. The perplexity deviation signal may be referred as a deep feature. In an example embodiment, the SLM PPL Deviation Percentile=CurPPL/(PPL_Mean+2*PPL_Std). CurPPL refers to the current perplexity and is calculated at runtime. CurPPL refers to the incoming new listing title's PPL value against the candidate LeafCat's SLM model. With reference to the formulas provided below, the term "PPL_Mean" may be referred to as mean_PPL and the term "PPL_Std" may be referred to as STD_PP.

During the SLM runtime re-ranking stage 1110A, when SSE produced a recall set of candidate LeafCat Ids, the SLP, PPL and the PPL Deviation values based on the requested publication listing's title against each candidate LeafCat's corresponding combined SLM for the LeafCat 1232 are calculated out at runtime. The LLP, PPL, SLP, PPL Deviation values are used to re-rank the whole recall leafCat candidate sets.

In an example embodiment, sentence PPL can be calculated as follows. Assume that a sentence S is made up of a sequence of N words such as $\{w_1, w_2, \ldots, w_N\}$. The perplexity of S is computed:

$$PP(S) = P(w_1 \ldots w_N)^{-1/N} = \sqrt[N]{\prod_{i=1}^{N} \frac{1}{P(w_i \mid w_1 \ldots w_{i-1})}}.$$

For a given LeafCat C, there may be M sentences (from the listing title) as the tuning set. These may be marked as $S_1, S_2, \ldots S_M$. For each of these title sentences, its corresponding perplexity can be computed based on the formula above. Then, the expected perplexity value and the related standard deviation value for the given LeafCatC, can be found according to the following formulas (note that all the mean_PP and STD_PP values can be precomputed and stored for runtime usage):

$$\text{Mean\_PP}(C) = \text{Mean\_PP}(S_1 \ldots S_M) = \frac{\sum PP(S_i)}{M}$$

$$\text{STD\_PP}(C) = \text{STD\_PP}(S_1 \ldots S_M) = \sqrt{\frac{\sum (PP(S_i) - \text{Mean\_PP}(C))^2}{M-1}}.$$

Figure 12:
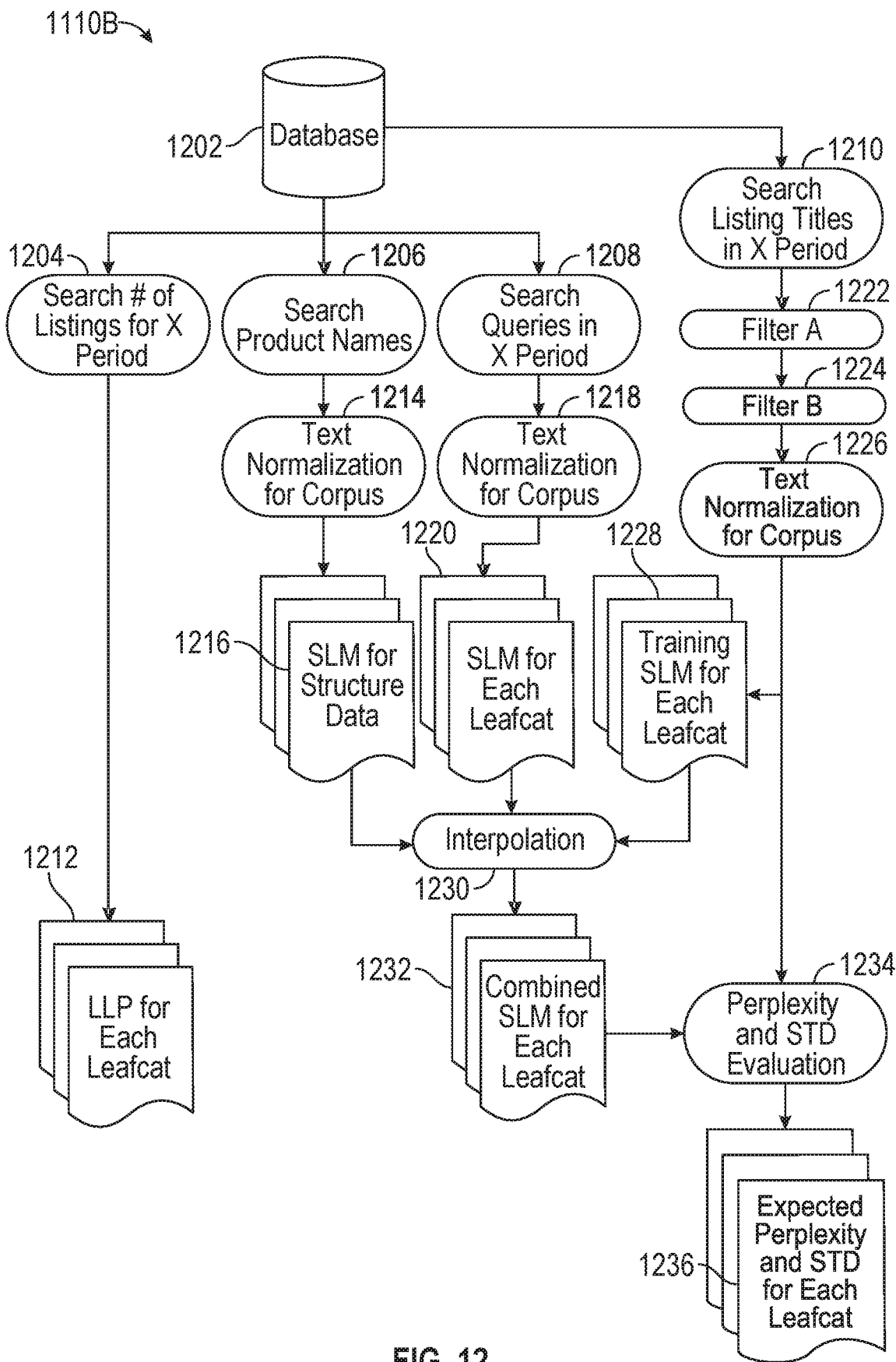
FIG. 12 illustrates a flow diagram for performing a first portion of an SSE-SLM-GBM offline training process, in accordance with one example embodiment.

FIG. 12 is a diagram illustrating an SLM training stage 1110B, in accordance with an example embodiment. For an example embodiment, the SLM training stage 1110B is part of the SLM re-ranking service 1110. The SLM training stage 1110B accesses a database 1202 containing publication information, which may include information listing titles, search queries, product names, etc. Various searches may be performed on this database to identify information relevant to the particular LeafCat for which the SLM model is being created.

Here, four searches have been specified: (1) a number of listings for the LeafCat in the recent X period (e.g., 8 weeks) at operation 1204; (2) a product name of every publication in the LeafCat at operation 1206; (3) queries performed on the LeafCat in the recent X period at operation 1208; and (4) listing titles in the recent X period for the LeafCatat operation 1210. The results of each of these searches is utilized in a different way. For the number of listings for the LeafCat in the recent X period accessed at operation 1204, this information is used to create a log prior probability (LPP) for the LeafCat at operation 1212. This process will be described in more detail below.

For the product name of every publication in the LeafCat accessed at operation 1206, this information is first normalized (e.g., misspellings or alternative spellings are corrected) through text normalization for a corpus at operation 1214, and then this information is used to construct an SLM for structured data 1216 corresponding to the structured data of the leaf category.

For the queries performed on the LeafCat in the recent X period accessed at the operation 1208, this information is first normalized (e.g., misspellings or alternative spellings are corrected) through text normalization for the corpus at operation 1218, and then this information is used to construct an SLM for the LeafCat 1220.

The listing titles in the recent X period for the LeafCat is accessed at operation 1210. This information is first passed through filters, including a filter A 1222 and a filter B 1224. These filters 1222, 1224 act to narrow down the listing titles to the most relevant. Here, for example, the filter A 1222 identifies listings in which the seller category selection matched with a top CatReco for the listing (based on a categorization algorithm). The filter B 1224, for example, identifies listings that have a lower probability of having been miscategorized by comparing a miscategorization score for each listing to a threshold (e.g., 60 out of 100, where 300 is the highest likelihood of the listing having been miscategorized). In this respect, this process is somewhat recursive since the miscategorization score is derived using a runtime process of the SLM re-ranking service 1110 for the leaf category, which is being trained in this stage shown in FIG. 12. Text normalization for the corpus at operation 1226 can then be performed to normalize the text of the filtered results. The results of this normalization can be used in two ways. First, an SLM for each LeafCat title 1228 can be created as part of the training set. Separately, the rest part of results can be used in a tuning set.

The SLM for the structured data 1216 (corresponding to the structured data of the leaf category), the SLM for each the LeafCat 1220, and the training SLM for each LeafCat 1228 can then be interpolated at operation 1230 to create a combined SLM for each LeafCat 1232.

On the tuning set side, the combined SLM for the LeafCat 1232 and the output of the text normalization for corpus at operation 1226 can be used in PPL and PPL_Std evaluation for each listing for the LeafCat at operation 1234, to create an expected PPL and PPL_Std for each LeafCat title 1236. This process is repeated for each leaf category.

Figure 13:
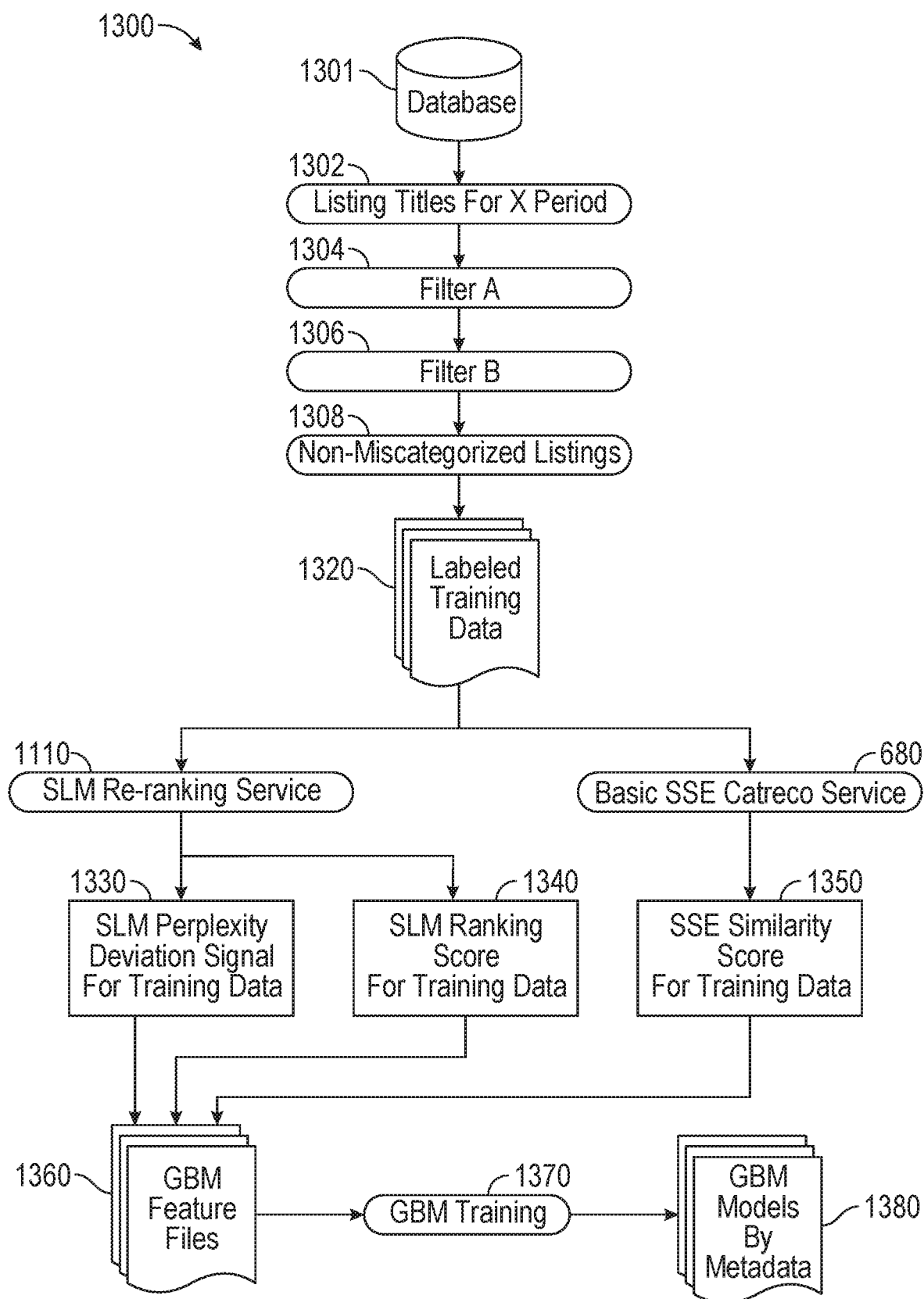
FIG. 13 illustrates a flow diagram for performing a second portion of an SSE-SLM-GBM offline training process, in accordance with one example embodiment.

FIG. 13 is a diagram illustrating a GBM training model process 1300, according to an example embodiment. In an offline unsupervised GBM training model process 1300, a set of bootstrapped labeled training data 1320 can be derived in an unsupervised manner by checking how CatRecos were selected and the related miscategorized scores. Once the labeled training data 1320 is obtained, a GBM feature input file 1360 can be prepared based the output from the SLM re-ranking service 1110 and the basic SSE CatReco service 680. More specifically, the SLM re-ranking service 1110 produces SLM perplexity deviation signal for the training data 1330 and the SLM ranking score for the training data 1340, and the basic SSE CatReco service 680 produces the SSE similarity score for the training data 1350. Then, a GBM training process can be used to train the GBM model. At operation 1370 the GBM feature files are used for the GBM training at operation 1370. The GBM training produces GBM models by metadata 1380.

According to FIG. 13, the labeled training data 1320 is obtained using operations 1302, 1304, 1306, and 1308. At the operation 1302, the listing titles for the recent X period for each LeafCat is accessed from a database 1301. For example, the recent X period may refer to the recent 8 weeks in an example embodiment. Two layers of filters are then applied to this information. At the operation 1304, filter A will consume operation 1302's output and only keep listings with the seller's category selections that match that match a top choice according to a CatReco algorithm, and then pass its results to next operation 1306 a next step filter B which only keep listings with a miscategorized score less than a second predetermined threshold (e.g., 35 out of 100, meaning a lower likelihood that the listing was miscategorized) are filtered. The listings titles that fulfil the requirements of those two layer fillers A and B are labeled as non-miscategorized at the operation 1308.

As described above, a perplexity deviation signal 1330 and a SLM ranking score 1340 can be derived from the SLM re-ranking service 1110 for each piece of the labeled training data 1320. Additionally, the SSE similarity score 1350 can be derived from the basic CatReco service 680 for each piece of the labeled training data 1320.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-6 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 14:
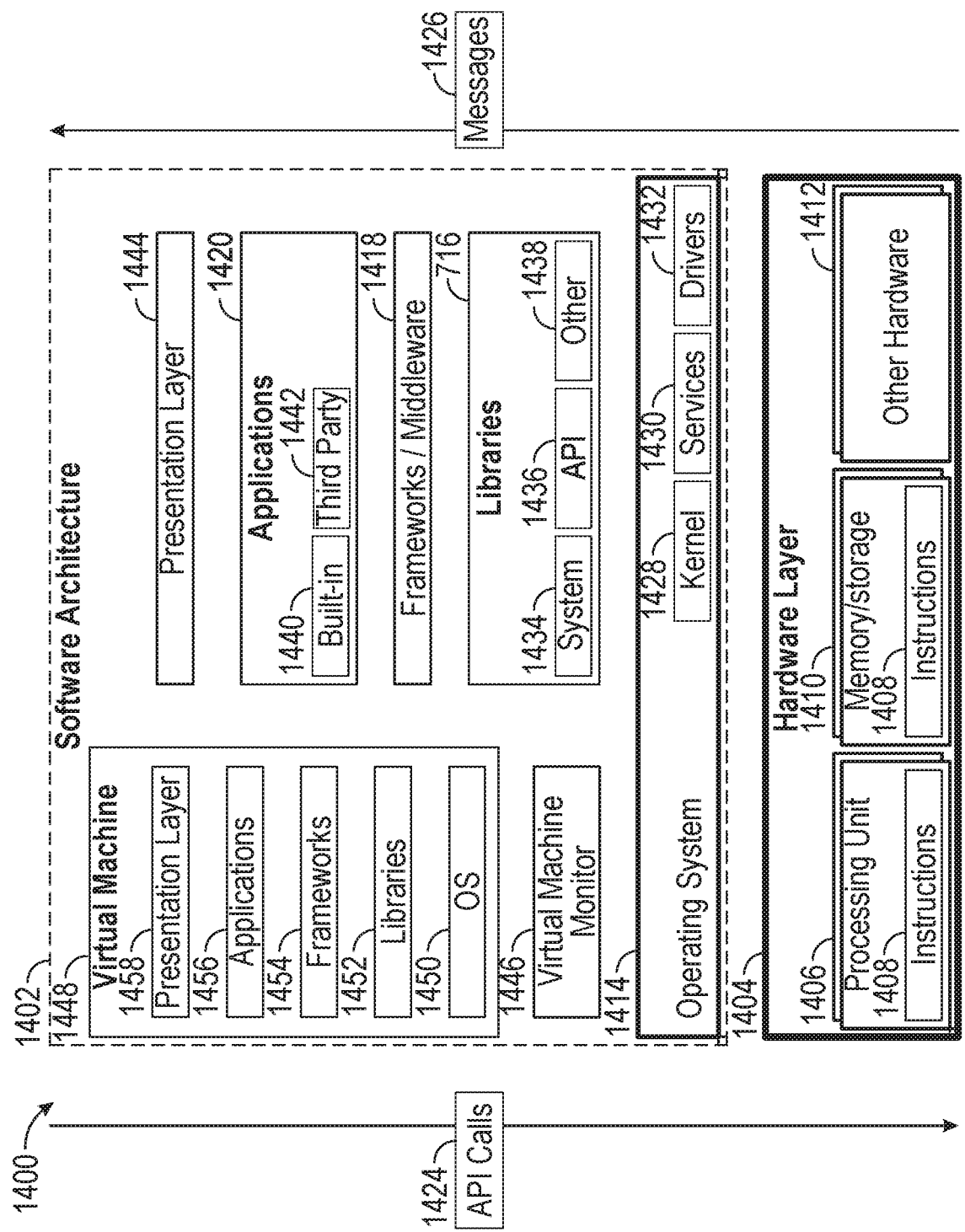
FIG. 14 is a block diagram illustrating an example of a software architecture that may be installed on a machine, according to some example embodiments.

FIG. 14 is a block diagram 1400 illustrating a representative software architecture 1402, which may be used in conjunction with various hardware architectures herein described. FIG. 14 is merely a non-limiting example of a software architecture and it will be appreciated that many other architectures may be implemented to facilitate the functionality described herein. The software architecture 1402 may be executing on hardware such as machine 1500 of FIG. 15 that includes, among other things, processors 1510, memory 1530, and I/O components 1550. A representative hardware layer 1404 is illustrated and can represent, for example, the machine 1500 of FIG. 15. The representative hardware layer 1404 comprises one or more processing units 1406 having associated executable instructions 1408. Executable instructions 1408 represent the executable instructions of the software architecture 1402, including implementation of the methods, modules and so forth of FIGS. 1-13. Hardware layer 1404 also includes memory or storage modules 1410, which also have executable instructions 1408. Hardware layer 1404 may also comprise other hardware as indicated by 1412, which represents any other hardware of the hardware layer 1404, such as the other hardware illustrated as part of machine 1500.

In the example architecture of FIG. 14, the software 1402 may be conceptualized as a stack of layers where each layer provides particular functionality. For example, the software 1402 may include layers such as an operating system 1414, libraries 1416, frameworks/middleware 1418, applications 1420 and presentation layer 1444. Operationally, the applications 1420 or other components within the layers may invoke API calls 1424 through the software stack and receive a response, returned values, and so forth (illustrated as messages 1426) in response to the API calls 1424. The layers illustrated are representative in nature and not all software architectures have all layers. For example, some mobile or special purpose operating systems may not provide a frameworks/middleware layer 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than to interface directly with the underlying operating system 1414 functionality (e.g., kernel 1428, services 1430, or drivers 1432). The libraries 1416 may include system 1434 libraries (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks 1418 (also sometimes referred to as middleware) may provide a higher-level common infrastructure that may be utilized by the applications 1420 or other software components/modules. For example, the frameworks 1418 may provide various graphic user interface (GUI) functions, high-level resource management, high-level location services, and so forth. The frameworks 1418 may provide a broad spectrum of other APIs that may be utilized by the applications 1420 and/or other software components/modules, some of which may be specific to a particular operating system or platform.

The applications 1420 include built-in applications 1440 and/or third party applications 1442. Examples of representative built-in applications 1440 may include, but are not limited to, a contacts application, a browser application, a book reader application, a location application a media application, a messaging application, and/or a game application. Third party applications 1442 may include any of the built in applications as well as a broad assortment of other applications. In a specific example, the third party application 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1442 may invoke the API calls 1424 provided by the mobile operating system such as operating system 1414 to facilitate functionality described herein.

The applications 1420 may utilize built in operating system functions (e.g., kernel 1428, services 1430 and/or drivers 1432), libraries (e.g., system 1434. APIs 1436, and other libraries 1438), and/or frameworks/middleware 1418 to create user interfaces to interact with users of the system. Alternatively, or additionally, in some systems, interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware machine (such as the machine of FIG. 15, for example). A virtual machine is hosted by a host operating system (operating system 1414 in FIG. 15) and typically, although not always, has a virtual machine monitor 1446, which manages the operation of the virtual machine as well as the interface with the host operating system (i.e., operating system 1414). A software architecture executes within the virtual machine such as an operating system 1450, libraries 1452, frameworks/middleware 1454, applications 1456, and/or presentation layer 1458. These layers of software architecture executing within the virtual machine 1448 can be the same as corresponding layers previously described or may be different.

Example Machine Architecture and Machine-Readable Medium

Figure 15:
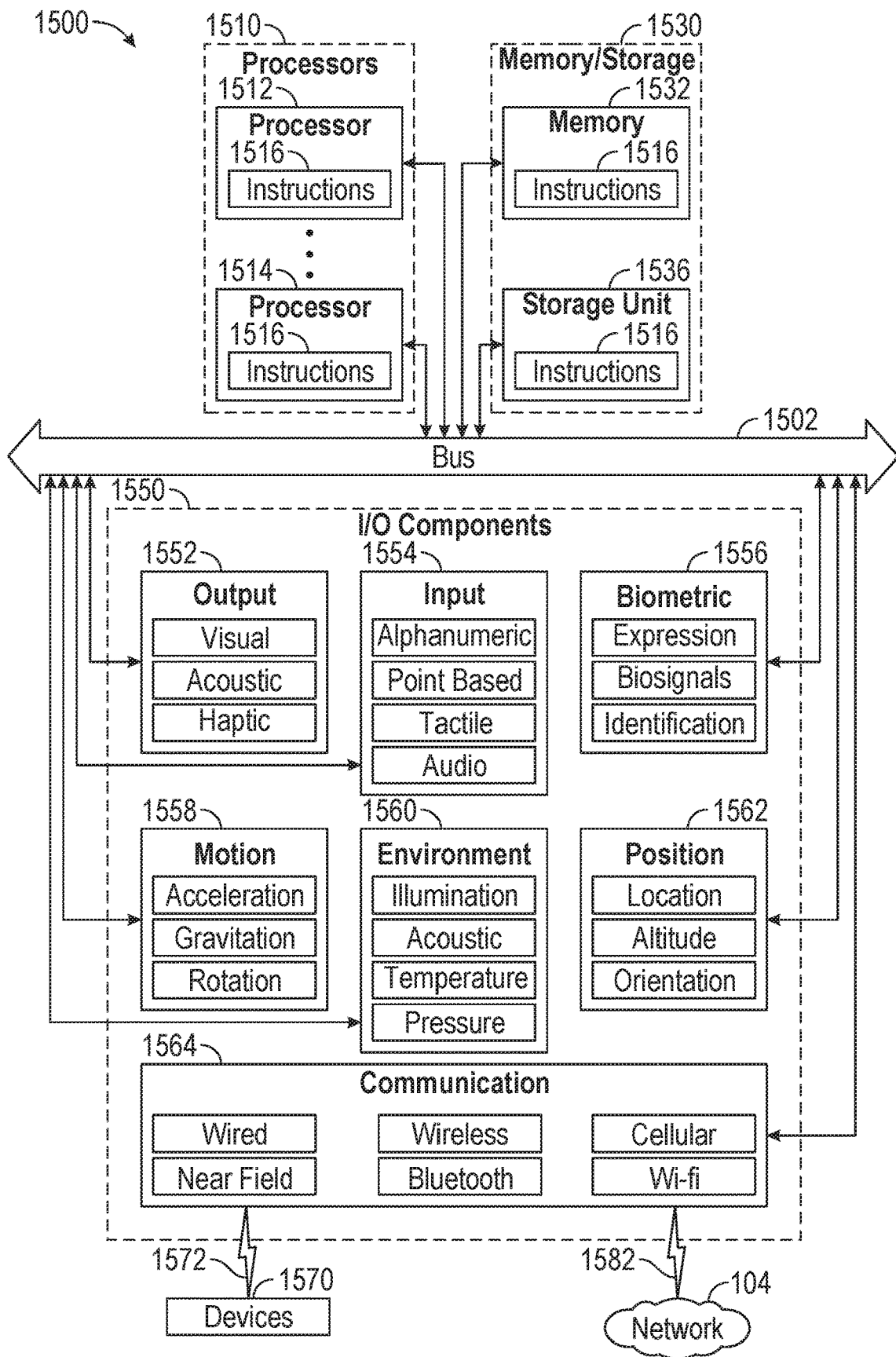
FIG. 15 illustrates a diagrammatic representation of a machine in the form of a computer system within which a set of instructions may be executed for causing the machine to perform any one or more of the methodologies discussed herein, according to an example embodiment.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example the instructions may cause the machine to execute the flow diagram of FIG. 14. Additionally, or alternatively, the instructions may implement FIGS. 5A-13, and so forth. The instructions transform the general, non-programmed machine into a particular machine programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1512 and processor 1514 that may execute instructions 1516. The term "processor" is intended to include multi-core processor that may comprise two or more independent processors (sometimes referred to as "cores") that may execute instructions contemporaneously. Although FIG. 15 shows multiple processors, the machine 1500 may include a single processor with a single core, a single processor with multiple cores (e.g., a multi-core process), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of processors 1510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 15515, environmental components 1560, or position components 1562, among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 15515 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 15150 or devices 1570 via coupling 1582 and coupling 1572, respectively. For example, the communication components 1564 may include a network interface component or other suitable device to interface with the network 104. In further examples, communication components 1564 may include wired communication components, wireless communication components, cellular communication components. Near Field Communication (NFC) components, Bluetooth® components (e.g., Bluetooth® Low Energy). Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include Radio Frequency Identification (RFID)

tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 104 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 104 or a portion of the network 104 may include a wireless or cellular network and the coupling 1582 may be a Code Division Multiple Access (CDMA) connection, a Global System for Mobile communications (GSM) connection, or other type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1516 may be transmitted or received over the network 104 using a transmission medium via a network interface device (e.g., a network interface component included in the communication components 1564) and utilizing any one of a number of well-known transfer protocols (e.g., hypertext transfer protocol (HTTP)). Singularly, the instructions 1516 may be transmitted or received using a transmission medium via the coupling 1572 (e.g., a peer-to-peer coupling) to devices 1570. The term "transmission medium" shall be taken to include any intangible medium that is capable of storing, encoding, or carrying instructions 1516 for execution by the machine 1500, and includes digital or analog communications signals or other intangible medium to facilitate communication of such software. A transmission medium is one embodiment of a machine readable medium.

Example Method

Figure 16:
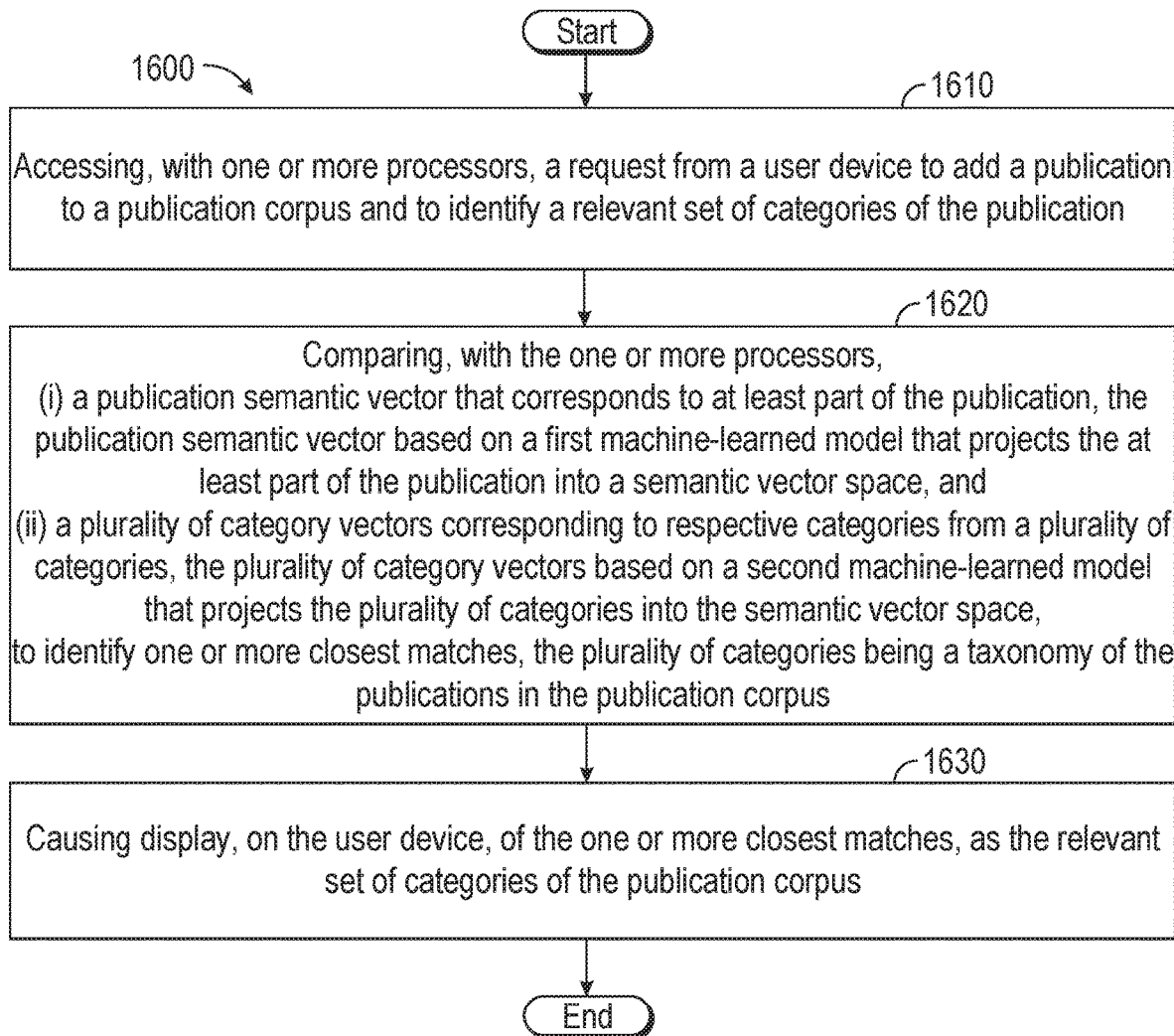
FIG. 16 illustrates an example method to compare and identify relevant categories of a publication.

FIG. 16 illustrates an example method 1600 to identify relevant categories of a publication. The method 1600 includes operation 1610 to access a request to add a publication to a publication corpus, operation 1620 to identify the relevant set of categories of the publication, and operation 1630 to display the relevant set of categories of the publication.

Operation 1610 accesses, with one or more processors, a request from a user device to add a publication to a publication corpus and to identify a relevant set of categories of the publication. For example, in FIG. 2, one or more processors in a server of the listing system 150 accesses the request from user device 204. FIG. 3B is an example of a publication that is added by request from the user device.

Operation 1620 compares, with the one or more processors, (i) a publication semantic vector that corresponds to at least part of the publication, the publication semantic vector based on a first machine-learned model that projects the at least part of the publication into a semantic vector space, and (ii) a plurality of category vectors corresponding to respective categories from a plurality of categories, the plurality of category vectors based on a second machine-learned model that projects the plurality of categories into the semantic vector space, to identify one or more closest matches, the plurality of categories being a taxonomy of the publications in the publication corpus. FIG. 4 is an example of identifying a closest match.

Operation 1630 causes display, on the user device, of the one or more closest matches, as the relevant set of categories of the publication corpus. For example, in FIG. 2, one or more processors in a server of the listing system 150 causes display on the user device 204. FIG. 3A is an example display of closest matches.

Language

Throughout this specification plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The following numbered examples are embodiments.

1. A method comprising:

accessing, with one or more processors, a request from a user device to add a publication to a publication corpus and to identify a relevant set of categories of the publication;

identifying, with the one or more processors, one or more closest matches between (i) a publication semantic vector that corresponds to at least part of the publication, the publication semantic vector based on a first machine-learned model that projects the at least part of the publication into a semantic vector space, and (ii) a plurality of category vectors corresponding to respective categories from a plurality of categories, the plurality of category vectors based on a second machine-learned model that projects the plurality of categories into the semantic vector space, the plurality of categories being a taxonomy of the publications in the publication corpus; and causing display, on the user device, of the one or more closest matches, as the relevant set of categories of the publication corpus.

2. The method of example 1, wherein the category is a leaf category

3. The method of example 1 or example 2, wherein the category is category path of at least two tree levels below a root level in a category tree of the plurality of categories.

4. The method of any one of examples 1 to 3, wherein the at least part of the publication includes a title of the publication.

5. The method of claim 1, wherein at least one of the first machine-learned model and the second machine-learned model are trained on data automatically derived from previously added publications of the publication corpus.

6. The method of any one of examples 1 to 5, wherein at least one of the first machine-learned model and the second machine-learned model are trained at one or more of a sub-word level and a character level to reduce out-of-vocabulary terms in runtime 7. The method of any one of examples 1 to 6, further comprising:

adding a new category to the plurality of categories without retraining the second machine-learned model on the new category, wherein the one or more closest matches identified as the one or more closest matches includes the new category.

8. A computer comprising:

a storage device storing instructions; and one or more hardware processors configured by the instructions to perform operations comprising:

accessing, with one or more processors, a request from a user device to add a publication to a publication corpus and to identify a relevant set of categories of the publication:

identifying, with the one or more processors, one or more closest matches between (i) a publication semantic vector that corresponds to at least part of the publication, the publication semantic vector based on a first machine-learned model that projects the at least part of the publication into a semantic vector space, and (ii) a plurality of category vectors corresponding to respective categories from a plurality of categories, the plurality of category vectors based on a second machine-learned model that projects the plurality of categories into the semantic vector space, the plurality of categories being a taxonomy of the publications in the publication corpus; and causing display, on the user device, of the one or more closest matches, as the relevant set of categories of the publication corpus.

9. The computer of example 8, wherein the category is a leaf category

10. The computer of example 8 or example 9, wherein the category is category path of at least two tree levels below a root level in a category tree of the plurality of categories.

11. The computer of any one of examples 8 to 10, wherein the at least part of the publication includes a title of the publication.

12. The computer of any one of examples 8 to 11, wherein at least one of the first machine-learned model and the second machine-learned model are trained on data automatically derived from previously added publications of the publication corpus.

13. The computer of any one of examples 8 to 12, wherein at least one of the first machine-learned model and the second machine-learned model are trained at one or more of a sub-word level and a character level to reduce out-of-vocabulary terms in runtime 14. The computer of claim 8, the operations further comprising:

adding a new category to the plurality of categories without retraining the second machine-learned model on the new category, wherein the one or more closest matches identified as the one or more closest matches includes the new category.

15. A hardware machine-readable device storing instructions that, when executed by one or more processors of a machine, cause the machine to perform operations comprising:

accessing, with one or more processors, a request from a user device to add a publication to a publication corpus and to identify a relevant set of categories of the publication;

identifying, with the one or more processors, one or more closest matches between (i) a publication semantic vector that corresponds to at least part of the publication, the publication semantic vector based on a first machine-learned model that projects the at least part of the publication into a semantic vector space, and (ii) a plurality of category vectors corresponding to respective categories from a plurality of categories, the plurality of category vectors based on a second machine-learned model that projects the plurality of categories into the semantic vector space, the plurality of categories being a taxonomy of the publications in the publication corpus; and causing display, on the user device, of the one or more closest matches, as the relevant set of categories of the publication corpus.

16. The computer of example 15, wherein the category is a leaf category

17. The computer of example 15 or example 16, wherein the category is category path of at least two tree levels below a root level in a category tree of the plurality of categories.

18. The computer of any one of examples 15 to 17, wherein the at least part of the publication includes a title of the publication.

19. The computer of any one of examples 15 to 18, wherein at least one of the first machine-learned model and the second machine-learned model are trained on data automatically derived from previously added publications of the publication corpus.

20. The computer of any one of examples 15 to 19, wherein at least one of the first machine-learned model and the second machine-learned model are trained at one or more of a sub-word level and a character level to reduce out-of-vocabulary terms in runtime 21. A machine readable medium carrying machine readable instructions that, when executed by one or more processors of a machine, cause the machine to carry out the method of any one of examples 1 to 7.

What is claimed is:

1. A method performed via hardware processing circuitry, comprising:
   accessing, with one or more processors, a request from a user device to add a publication to a publication corpus and to identify a relevant set of categories of the publication;
   generating a publication semantic vector in a semantic vector space based on sequence sematic embedding of at least a portion of the publication, and further based on a first machine learned model;
   comparing (i) the publication semantic vector, and (ii) a plurality of category vectors corresponding to respective categories from a plurality of categories, the plurality of category vectors based on a second machine-learned model that projects the plurality of categories into the semantic vector space, to identify one or more closest matches, the plurality of categories being a taxonomy of the publications in the publication corpus;
   determining a subset of the plurality of the respective categories being the closest matches with the publication semantic vector;
   ranking the subset based on an expected perplexity of each of the categories in the subset and a perplexity of the at least part of the publication, the expected perplexity of each of the categories based on separate perplexities of each sentence of publications included in the respective category; and
   causing display, on the user device, of a highest ranked portion of categories in the subset as the relevant set of categories of the publication corpus.

2. The method of claim 1, wherein the ranking of the subset is further based on a standard deviation of the perplexity of each of the categories in the subset.

3. The method of claim 1, wherein at least one of the first machine-learned model and the second machine-learned model are trained on data automatically derived from previously added publications of the publication corpus.

4. The method of claim 1, wherein at least one of the first machine-learned model and the second machine-learned model are trained at one or more of a sub-word level and a character level to reduce out-of-vocabulary terms in runtime.

5. The method of claim 1, further comprising:
   adding a new category to the plurality of categories without retraining the second machine-learned model on the new category, wherein the one or more closest matches identified as the one or more closest matches includes the new category.

6. The method of claim 1, the operations further comprising hashing words of the at least a portion of the publication, wherein the generation of the publication semantic vector is based on the hashed words.

7. A computer comprising:
   a storage device storing instructions; and
   one or more hardware processors configured by the instructions to perform operations comprising:
   accessing a request from a user device to add a publication to a publication corpus and to identify a relevant set of categories of the publication;
   generating a publication semantic vector in a semantic vector space based on sequence sematic embedding of at least a portion of the publication, and further based on a first machine learned model;
   comparing, with the one or more processors, (i) the publication semantic vector, and (ii) a plurality of category vectors corresponding to respective categories from a plurality of categories, the plurality of category vectors based on a second machine-learned model that projects the plurality of categories into the semantic vector space, to identify one or more closest matches, the plurality of categories being a taxonomy of the publications in the publication corpus;
   determining a subset of the plurality of the respective categories being the closest matches with the publication semantic vector;
   ranking the subset based on an expected perplexity of each of the categories in the subset and a perplexity of the at least part of the publication, the expected perplexity of each of the categories based on separate perplexities of each sentence of publications included in the respective category; and
   causing display, on the user device, of a highest ranked portion of categories in the subset as the relevant set of categories of the publication corpus.

8. The computer of claim 7, wherein the ranking of the subset is further based on a log likelihood probability of each of the categories in the subset.

9. The computer of claim 7, wherein at least one of the first machine-learned model and the second machine-learned model are trained on data automatically derived from previously added publications of the publication corpus.

10. The computer of claim 7, wherein at least one of the first machine-learned model and the second machine-learned model are trained at one or more of a sub-word level and a character level to reduce out-of-vocabulary terms in runtime.

11. The computer of claim 7, the operations further comprising:
    adding a new category to the plurality of categories without retraining the second machine-learned model on the new category, wherein the one or more closest matches identified as the one or more closest matches includes the new category.

12. A hardware machine-readable device storing instructions that, when executed by one or more processors of a machine, cause the machine to perform operations comprising:
    accessing, with one or more processors, a request from a user device to add a publication to a publication corpus and to identify a relevant set of categories of the publication;
    generating a publication semantic vector in a semantic vector space based on sequence sematic embedding of at least a portion of the publication, and further based on a first machine learned model;
    comparing, with the one or more processors, (i) the publication semantic vector, and (ii) a plurality of category vectors corresponding to respective categories from a plurality of categories, the plurality of category vectors based on a second machine-learned model that projects the plurality of categories into the semantic vector space, to identify one or more closest matches, the plurality of categories being a taxonomy of the publications in the publication corpus;

determining a subset of the plurality of the respective categories being the closest matches with the publication semantic vector;

ranking the subset based on an expected perplexity of each of the categories in the subset and a perplexity of the at least part of the publication, the expected perplexity of each of the categories based on separate perplexities of each sentence of publications included in the respective category; and causing display, on the user device, of a highest ranked portion of categories in the subset as the relevant set of categories of the publication corpus.

13. The machine-readable device of claim 12, wherein the ranking of the subset is further based on a standard deviation of the perplexity of each of the categories in the subset.

14. The machine-readable device of claim 12, wherein the ranking of the subset is further based on a log likelihood probability of each of the categories in the subset.

15. The machine-readable device of claim 12, wherein at least one of the first machine-learned model and the second machine-learned model are trained at one or more of a sub-word level and a character level to reduce out-of-vocabulary terms in runtime.

16. The machine-readable device of claim 12, wherein the first machine-learned model is trained based on a first element of a labeled pair of training elements and the second machine-learned model is trained based on a second element of the labeled pair of training elements, wherein the first and second elements are encoded using sequence semantic embedding.

17. The machine-readable device of claim 12, wherein the generation of the publication semantic vector encodes a sequence of symbols into the semantic vector space, each of the symbols representing a sentence or paragraph of the publication.

18. The machine-readable device of claim 17, wherein semantic level similar sequences are encoded to have closer representation in the semantic vector space.

19. The machine-readable device of claim 12, wherein the ranking of the subset is based on a separate language model for each category in the subset, wherein each separate language model is trained using statistical language modeling, and the ranking evaluates a sentence log probability (SLP) of the publication's title using each separate language model of each category in the subset.

20. The machine-readable device of claim 12, wherein the ranking of the subset is based on gradient boosting machine ensembled signals from sentence embedding similarity scores derived from semantic sequence embedding modeling, and category specific language model perplexity scores derived using statistical language modeling (SLM).

* * * * *